(12) United States Patent
Freebury et al.

(10) Patent No.: US 9,593,485 B2
(45) Date of Patent: Mar. 14, 2017

(54) DEPLOYMENT SYSTEM FOR SUPPORTED RETRACTABLE EXTENSION OF A COMPOSITE BOOM

(71) Applicant: Roccor, LLC, Louisville, CO (US)

(72) Inventors: Gregg E Freebury, Louisville, CO (US); William H Francis, Boulder, CO (US); Neal J Beidleman, Aspen, CO (US)

(73) Assignee: ROCCOR, LLC, Louisville, CO (US)

( * ) Notice: Subject to any disclaimer, the term of this patent is extended or adjusted under 35 U.S.C. 154(b) by 0 days.

(21) Appl. No.: 14/645,844

(22) Filed: Mar. 12, 2015

(65) Prior Publication Data

US 2015/0259911 A1 Sep. 17, 2015

Related U.S. Application Data

(60) Provisional application No. 61/952,018, filed on Mar. 12, 2014.

(51) Int. Cl.
*E04C 3/00* (2006.01)
*B29C 53/20* (2006.01)
(Continued)

(52) U.S. Cl.
CPC .............. *E04C 3/005* (2013.01); *B29C 53/20* (2013.01); *B29C 70/30* (2013.01); *B32B 5/00* (2013.01); *B32B 5/12* (2013.01); *B66F 11/046* (2013.01); *E04C 3/29* (2013.01); *E04H 12/18* (2013.01); *B32B 3/04* (2013.01); *B32B 5/08* (2013.01); *B32B 5/26* (2013.01); *B32B 7/12* (2013.01); *B32B 37/12* (2013.01); *B32B 38/08* (2013.01); *B32B 2255/02* (2013.01); *B32B 2260/021* (2013.01); *B32B 2262/0253* (2013.01); *B32B 2262/0269* (2013.01); (Continued)

(58) Field of Classification Search
CPC .......... E04H 12/18; B64G 9/00; B64G 1/222; B29C 53/20; E04C 3/005; E04C 3/29; B32B 5/00; B32B 5/12
See application file for complete search history.

(56) References Cited

U.S. PATENT DOCUMENTS 3,144,104 A * 8/1964 Weir et al. ...................... 52/108
3,144,215 A * 8/1964 Klein .......................... 242/388.6
(Continued)

FOREIGN PATENT DOCUMENTS

WO WO 00/64663 11/2000
WO WO 02/06619 1/2002
(Continued)

OTHER PUBLICATIONS

U.S. Appl. No. 61/952,018, filed Mar. 12, 2014.
(Continued)

*Primary Examiner* — Adriana Figueroa
*Assistant Examiner* — Jessie Fonseca
(74) *Attorney, Agent, or Firm* — Craig R. Miles; CR Miles P.C.

(57) ABSTRACT

A deployment system for supported retractable extension of composite booms which interconverts between a retracted reduced volume stowed condition and an extended elongate tubular condition supported to carry a wide variety of mountable objects at an extended tip end.

22 Claims, 20 Drawing Sheets

(51) Int. Cl.
*E04H 12/18* (2006.01)
*B32B 5/12* (2006.01)
*B66F 11/04* (2006.01)
*E04C 3/29* (2006.01)
*B32B 5/00* (2006.01)
*B29C 70/30* (2006.01)
*B32B 5/08* (2006.01)
*B32B 5/26* (2006.01)
*B32B 7/12* (2006.01)
*B32B 37/12* (2006.01)
*B32B 38/08* (2006.01)
*B32B 3/04* (2006.01)

(52) U.S. Cl.
CPC ... *B32B 2262/0276* (2013.01); *B32B 2262/10* (2013.01); *B32B 2262/101* (2013.01); *B32B 2262/106* (2013.01); *B32B 2262/14* (2013.01); *B32B 2305/07* (2013.01); *B32B 2305/10* (2013.01); *B32B 2305/22* (2013.01)

(56) References Cited

U.S. PATENT DOCUMENTS

| | | | |
|---|---|---|---|
| 3,213,573 A * | 10/1965 | Bohr et al. | 52/108 |
| 3,360,894 A * | 1/1968 | Orr et al. | 52/108 |
| 3,361,377 A * | 1/1968 | Trexler, Jr. | 242/390.2 |
| 3,385,397 A * | 5/1968 | Robinsky | 182/41 |
| 3,434,674 A * | 3/1969 | Groskopfs | 242/390.2 |
| 3,528,543 A * | 9/1970 | Robinsky | 428/178 |
| 3,564,789 A | 2/1971 | Vyvyan et al. | |
| 3,589,632 A * | 6/1971 | Rew | 436/509 |
| 3,608,844 A * | 9/1971 | Tumulty et al. | 242/899 |
| 3,696,568 A * | 10/1972 | Berry | 52/108 |
| 3,784,441 A | 1/1974 | Kaempen | |
| 3,811,633 A * | 5/1974 | Cummings et al. | 226/172 |
| 3,862,528 A * | 1/1975 | Meissinger | 52/108 |
| 3,978,489 A * | 8/1976 | Kurland | H01Q 1/085 343/874 |
| 4,047,339 A * | 9/1977 | Smith et al. | 52/108 |
| 4,796,797 A * | 1/1989 | Nakako | B21D 5/12 228/144 |
| 4,991,784 A | 2/1991 | Schmid | |
| 5,088,014 A * | 2/1992 | Boughey | 362/132 |
| 5,235,788 A * | 8/1993 | Maimets | 52/108 |
| 5,348,096 A | 9/1994 | Williams | |
| 5,882,322 A | 3/1999 | Kim et al. | |
| 6,065,540 A | 5/2000 | Thomeer et al. | |
| 6,131,431 A * | 10/2000 | Ona | 72/176 |
| 6,217,975 B1 * | 4/2001 | Daton-Lovett | 428/105 |
| 6,256,938 B1 | 7/2001 | Daton-Lovett | |
| 6,454,493 B1 * | 9/2002 | Lohbeck | 405/184.2 |
| 6,602,574 B1 | 8/2003 | Daton-Lovett | |
| 6,920,722 B2 | 7/2005 | Brown et al. | |
| 7,251,323 B2 | 7/2007 | Holtorf et al. | |
| 7,617,639 B1 | 11/2009 | Pollard et al. | |
| 7,694,465 B2 | 4/2010 | Pryor | |
| 7,806,370 B2 | 10/2010 | Beidleman et al. | |
| 7,895,795 B1 * | 3/2011 | Murphey et al. | 52/108 |
| 8,006,462 B2 | 8/2011 | Murphy et al. | |
| 8,689,514 B1 | 4/2014 | Sternowski | |
| 8,893,442 B1 * | 11/2014 | Spence et al. | 52/108 |
| 2002/0112417 A1 * | 8/2002 | Brown et al. | 52/108 |
| 2006/0272265 A1 * | 12/2006 | Pryor | 52/645 |
| 2007/0006963 A1 | 1/2007 | Bever | |
| 2007/0181241 A1 | 8/2007 | Kramer et al. | |
| 2008/0078139 A1 | 4/2008 | Overby | |
| 2011/0195209 A1 | 8/2011 | Bosman et al. | |
| 2011/0204186 A1 | 8/2011 | Keller et al. | |
| 2011/0308174 A1 * | 12/2011 | Meyer | 52/111 |
| 2012/0297717 A1 | 11/2012 | Keller et al. | |
| 2013/0061541 A1 * | 3/2013 | Taylor et al. | 52/108 |

FOREIGN PATENT DOCUMENTS

| | | |
|---|---|---|
| WO | WO 2014/081943 | 5/2014 |
| WO | WO 2014/127292 | 8/2014 |

OTHER PUBLICATIONS

U.S. Appl. No. 61/729,129, filed Nov. 21, 2012.
International Search Report and Written Opinion for PCT International Patent Application No. PCT/US2013/071266, mailed May 12, 2014, 12 pages total.
U.S. Appl. No. 61/765,641, filed Feb. 15, 2013.
International Search Report and Written Opinion for PCT International Patent Application No. PCT/US2014/016605, mailed Jun. 3, 2014, 13 pages total.
Astro Aerospace Corporation. STEM Design & Performance. Website, http://www.as.northropgrumman.com, originally downloaded Oct. 24, 2012, 9 total pages.
Galletly et al. Bistable composite slit tubes. I. A beam model. International Journal of Solids and Structures, 2004, 41:4517-4533.
Iqbal et al. Bi-Stable Composite Shells. Proc. 41st AIAA Structures, Structural Dynamics, and Materials Conference and Exhibit, Apr. 2000, Atlanta, GA, USA, 8 total pages.
Northrop Grumman. Astro Aerospace: Deployable Structures and Mechanisms for Space Applications.Website, http://www.as.northropgrumman.com,originally downloaded Jun. 12, 2015,4 pgs.
Northrop Grumman. 150-lb Linear Actuator Stem. Website, http://www.as.northropgrumman.com, originally downloaded Oct. 24, 2012, 2 total pages.
Prigent. A Finite Element Model of Bi-Stable Woven Composite Tape-Springs. KTH, Thesis submitted for the Master's degree, Stockholm, Sweden, Oct. 2011.
Rolatube Extending Technology. Rolatube Technology: Product Brochure: Defense and Security. Website, http://www.rolatube.com, originally downloaded Oct. 24, 2012, 20 total pages.
Rolatube Extending Technology. Website, http://www.rolatube.com, originally downloaded Jun. 12, 2015, 2 total pages.
Rolatube Technology Ltd. A Brief Introduction to Bi-Stable Reeled Composites. Website, http://www.rolatube.com, originally downloaded Oct. 24, 2012, 9 total pages.
Straubel, Hillebrandt and Belvin. Results of Research Study: Evaluation of Deployable Space Mast Concepts. Final Presentation, NASA—LaRC, dated Sep. 28, 2011, 54 total pages.
Straubel. Large Deployable Structures. Gossamer Concepts for Versatile Applications. SpacePlan 2020; University of Surrey, Feb. 27, 2014, Guildford, UK; 12 pages total.

* cited by examiner

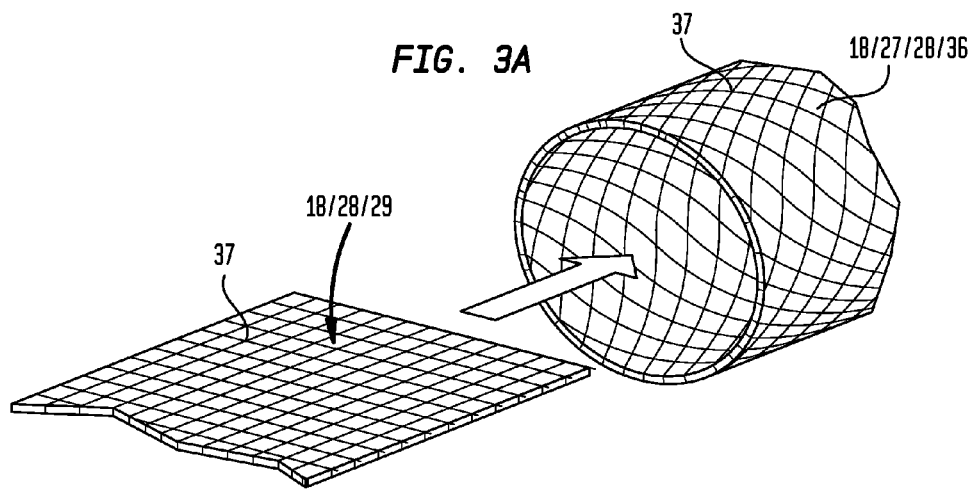
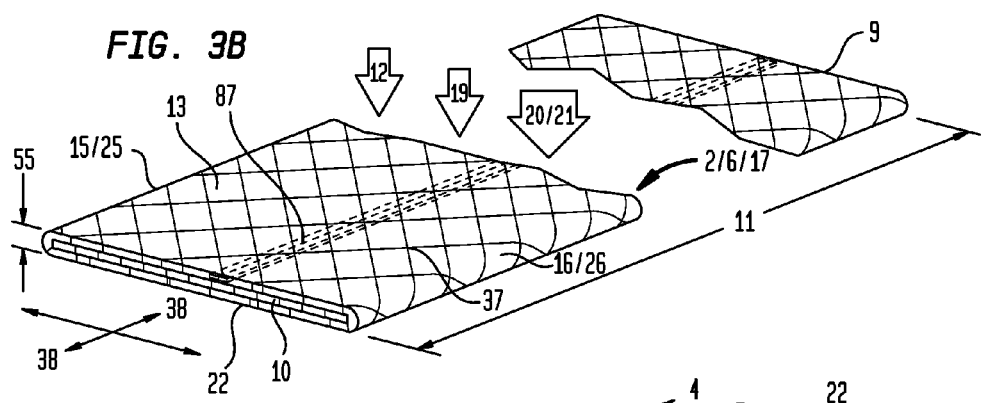
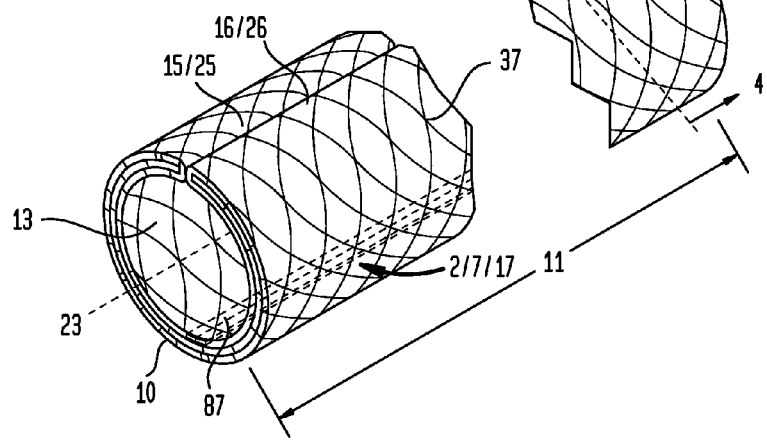

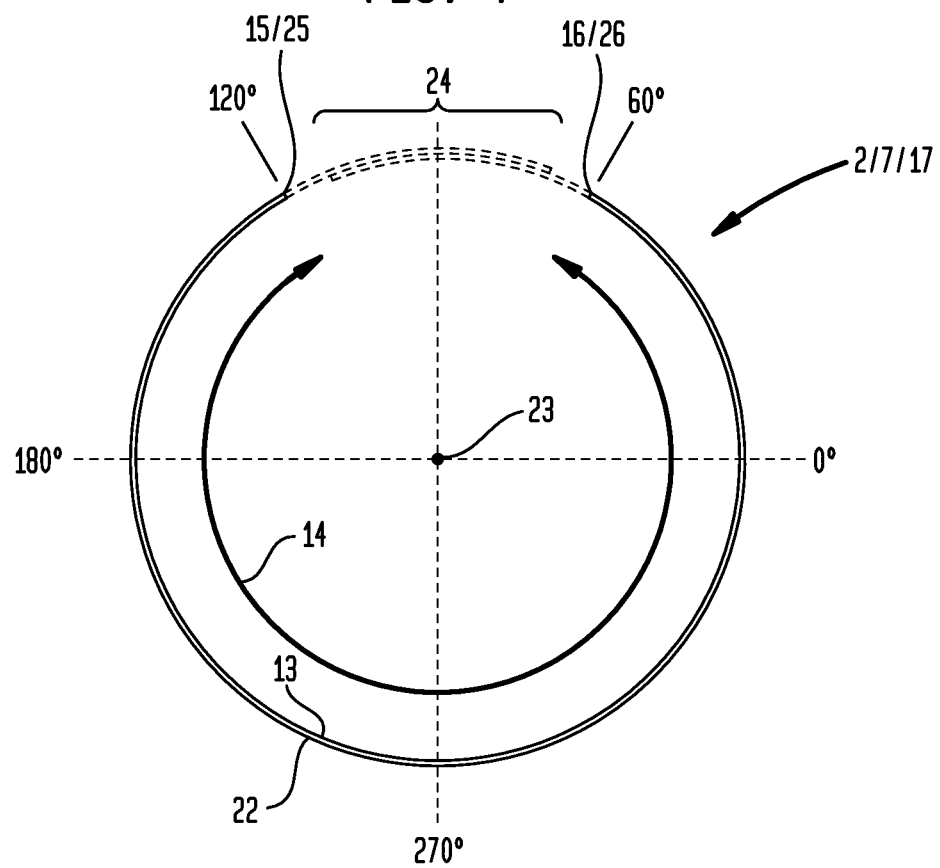

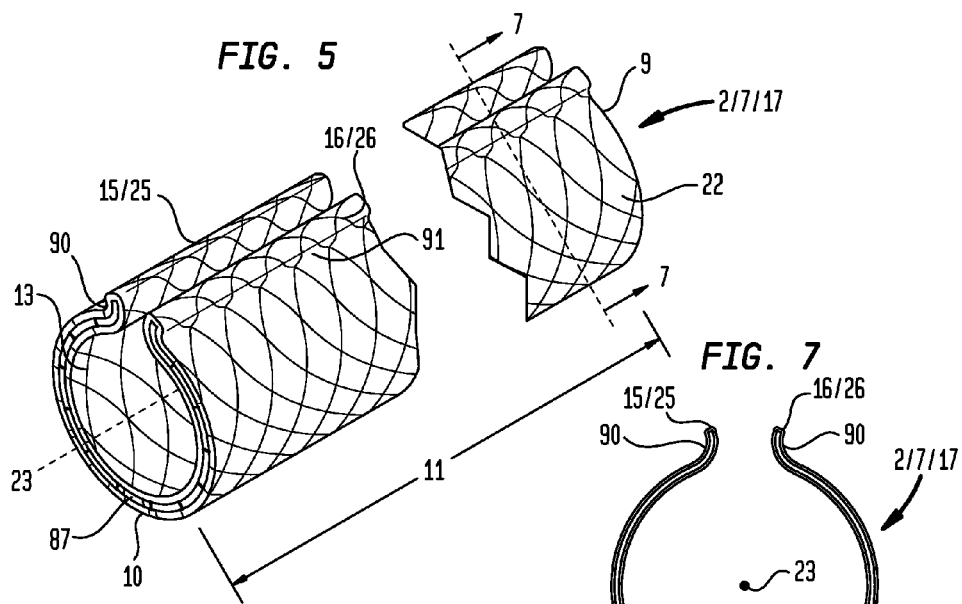
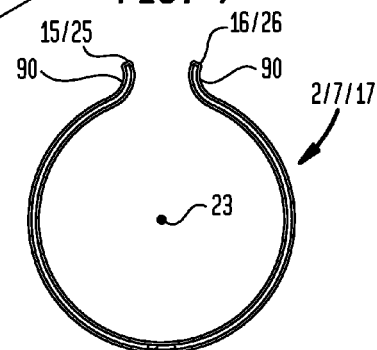
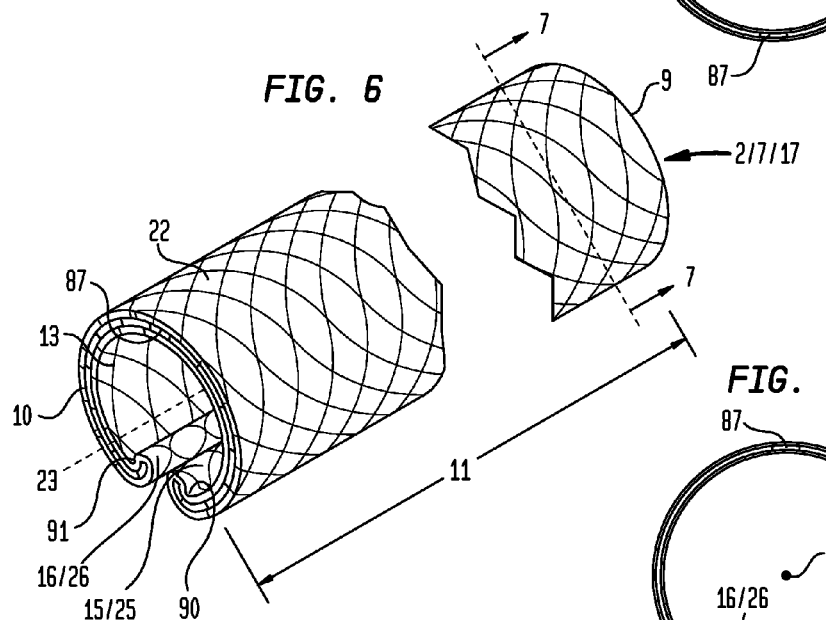
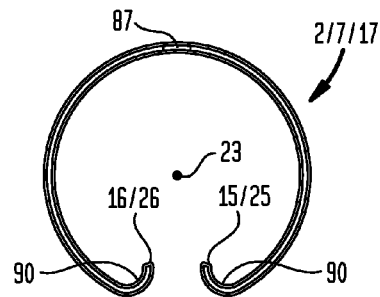

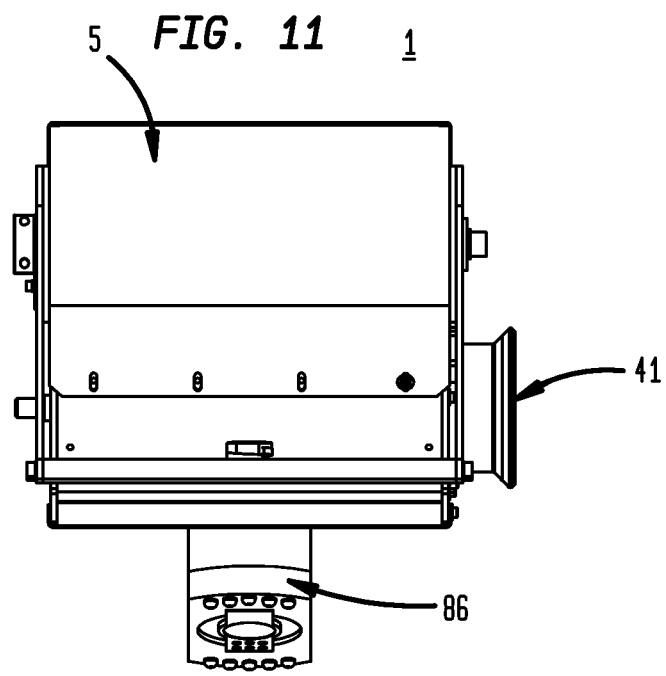
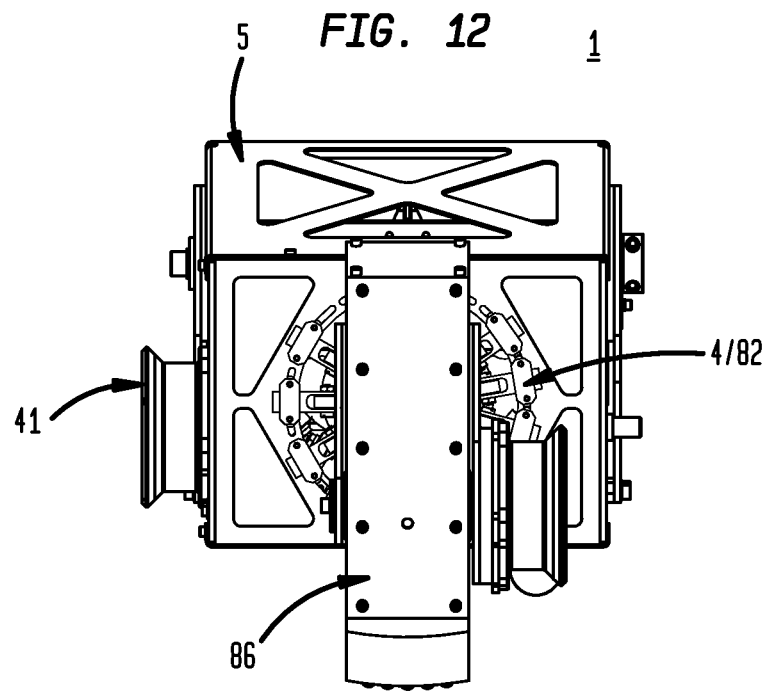

DEPLOYMENT SYSTEM FOR SUPPORTED RETRACTABLE EXTENSION OF A COMPOSITE BOOM

This United States Non-Provisional Patent Application claims the benefit of U.S. Provisional Patent Application No. 61/952,018, filed Mar. 12, 2014, hereby incorporated by reference herein.

I. BACKGROUND

There is a need for a deployment system for retractable extension of composite booms which interconvert between a retracted reduced volume stowed condition and an extended elongate tubular condition supported to carry a wide variety of mountable objects at the extended tip end.

II. SUMMARY OF THE INVENTION

Accordingly, a broad object of the invention can be to provide a deployment system for supported retractable extension of a composite boom which includes a composite boom deployer which operates to extend and retract a composite boom which interconverts between a reduced volume stowed condition in which the composite boom in a planate condition winds concentrically into a rolled condition and upon extension of the tip end progressively achieves an elongate tubular condition to provide a boom having tip end to which a wide variety of objects can be mounted.

Another broad object of the invention can be to provide a laminate structure and a method of making the laminate structure for composite booms which can interconvert between a planate condition and a tubular condition and which can further include longitudinal edge portions extending along said boom length of said tubular condition configured to project the boom longitudinal edge either away from or toward the central longitudinal axis of the tubular condition to axially stiffen the tubular condition of the composite boom.

Another broad object of the invention can be to provide a laminate structure and a method of making the laminate structure for composite booms which avoids or reduces fraying or detachment of fibers along the boom longitudinal edges by providing boom longitudinal overwrapped laminate edges which can be received within a corresponding longitudinal edge receiving elements to control interconversion of the planate condition of a composite boom toward the tubular condition of the composite boom.

Another broad object of the invention can be to provide at least one composite boom support assembly which provides one or more support members which can be disposed in radial spaced apart relation about the circumference of the external surface or internal surface of the composite boom to provide support of the composite boom during retractable extension and use with objects mounted to the tip end of the boom.

Naturally, further objects of the invention are disclosed throughout other areas of the specification, drawings, and claims.

III. A BRIEF DESCRIPTION OF THE DRAWINGS

FIG. 3A illustrate a method of making another particular embodiment of the composite boom laminate having overwrapped laminate edges by insertion of a second laminable material in side of a tubular laminable material.

FIG. 3B illustrates a method of making particular embodiment of the composite boom laminate having overwrapped laminate edges by further applying adherent, temperature or pressure.

FIG. 3C illustrates a method of making particular embodiment of the composite boom laminate having overwrapped laminate edges by the method illustrated in FIGS. 3A and 3B disposed in the tubular condition.

FIG. 4 is a cross sectional view 4-4 of the composite boom shown in FIGS. 2C and 3C.

FIG. 5 is a perspective view of a composite boom having first and second arcuate edge portions projecting the boom first and second longitudinal edges away from the central longitudinal axis of the composite boom.

FIG. 6 is a perspective view of a composite boom having first and second arcuate edge portions projecting the boom first and second longitudinal edges toward the central longitudinal axis of the composite boom.

FIG. 7 is a cross sectional view 7-8 of the composite boom shown in FIG. 5.

FIG. 8 is a cross sectional view 8-8 of the composite boom shown in FIG. 6.

FIG. 11 is a first end view of a particular embodiment of the inventive deployment system for supported retractable extension of a composite boom.

FIG. 12 is second end view of a particular embodiment of the inventive deployment system for supported retractable extension of a composite boom.

IV. DETAILED DESCRIPTION OF THE PREFERRED EMBODIMENTS

Figure 1:
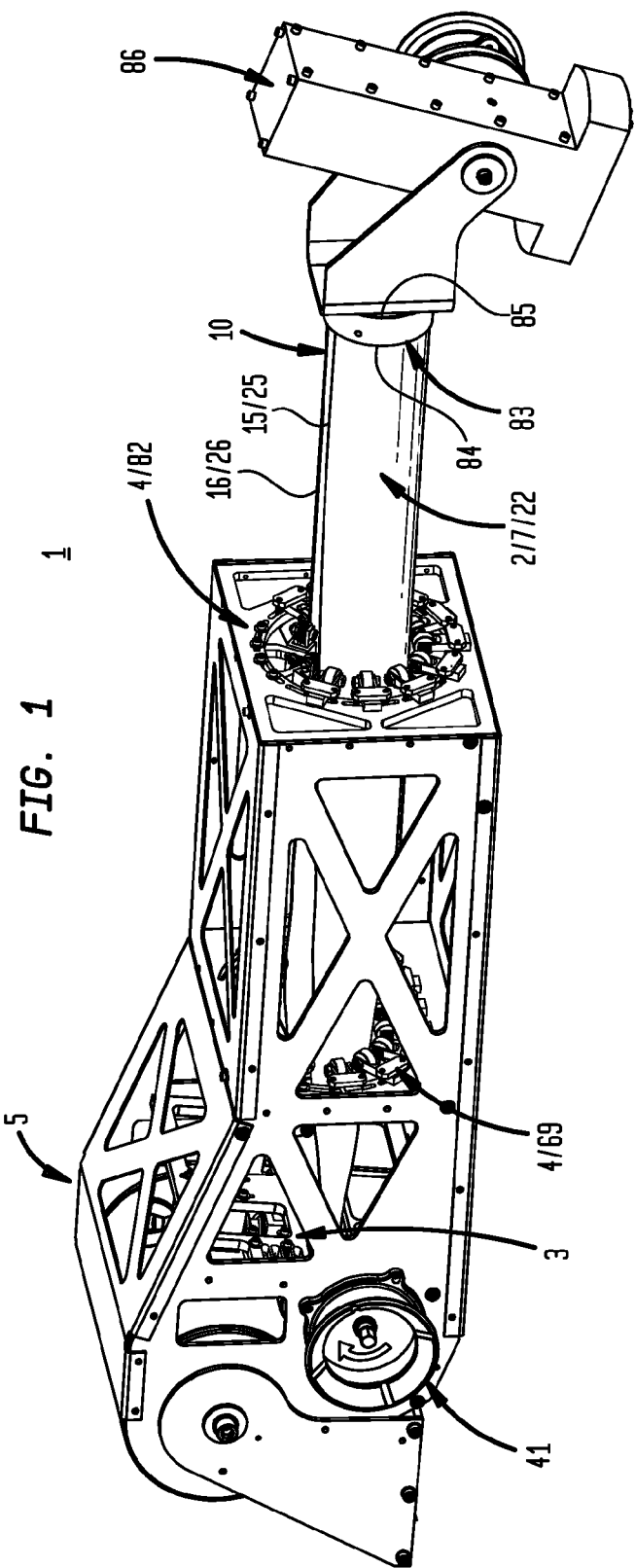
FIG. 1 is a perspective view of an embodiment the inventive deployment system for supported retractable extension of a composite boom.

Now referring to FIGS. 1 through 22I, which generally depict exemplary embodiments of an inventive deployment system (1) for supported retractable extension of a composite boom (2). The deployment system (1) can include one or more of: a composite boom (2) (also referred to as "a boom"), a composite boom deployer (3) (also referred to as "a deployer"), and a composite boom support assembly (4) (also referred to as "a support assembly") which can, but not necessarily, be operationally disposed in a deployer housing (5).

Now referring primarily to FIGS. 2A through 2C, 3A through 3C, and 4 through 8, particular embodiments of the boom (2) can interconvert between a generally planate condition (6) (also referred to as a "planate condition") and a generally tubular condition (7) (also referred to as a "tubular condition") (as shown in the examples of FIGS. 2A through 2C and 3A through 3C). The planate condition (6) of the boom (2) can further interconvert with a rolled condition (8) to reduce the volume of the boom (2) (as shown in the examples of FIGS. 14 through 17). The rolled condition (8) of the boom (2) can be achieved by concentrically winding or coiling the planate condition (6) from a root end (9) toward a tip end (10).

Figure 2A:
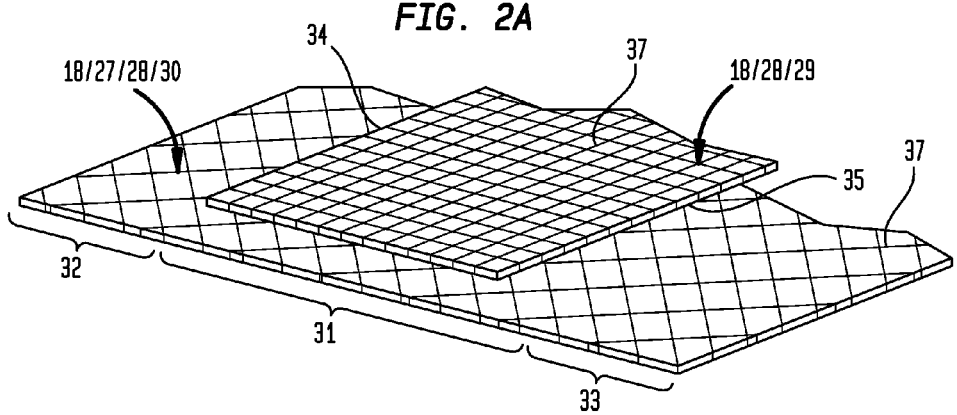
FIG. 2A illustrates a method of making particular embodiment of the composite boom laminate having overwrapped laminate edges by overlaying a first laminable material with a second laminable material.
Figure 2B:
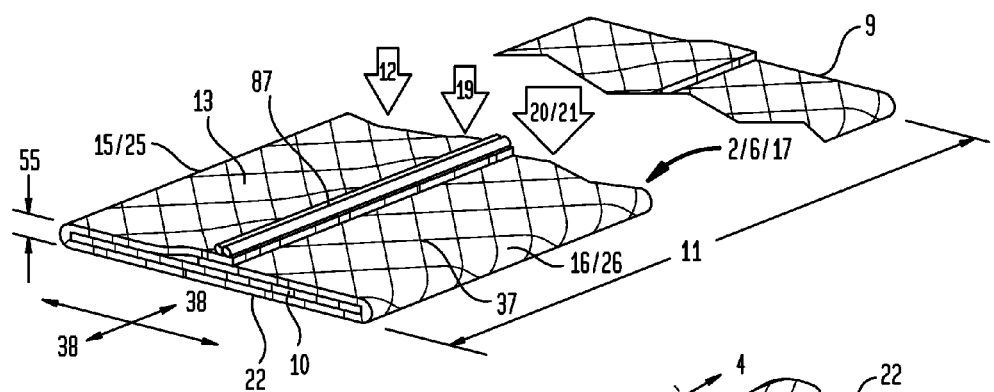
FIG. 2B illustrates a method of making particular embodiment of the composite boom laminate having overwrapped laminate edges by further overwrapping the edges of the second laminable material with the first laminable material and applying adherent, temperature or pressure.

For the purposes of this invention, the term "planate condition" means as to an entire boom length (11) between the root end (9) and the tip end (10), or as to any portion of the boom length (11), that the boom (2) has a generally flattened configuration (as shown in the examples of FIGS. 2B and 3B). As to particular embodiments, the application of flattening forces (12) upon the boom (2) can achieve a substantially flat surface along a portion or the entire boom length (11), while as to other embodiments, the boom (2) can achieve a substantially flat surface proximate the application of flattening forces (12) with progressively increasing curvature of a boom internal surface (13) (also referred to as an "internal surface") occurring with increased distance from the application of flattening forces (12).

Figure 2C:
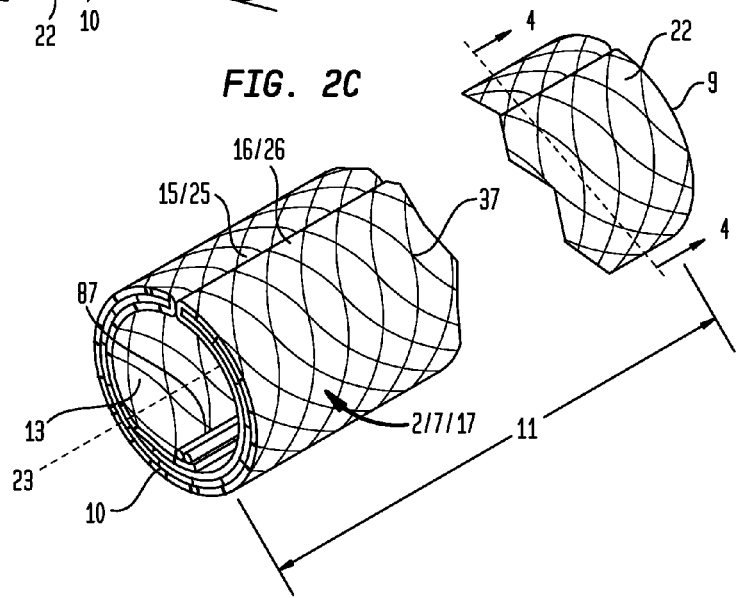
FIG. 2C illustrates a particular embodiment of the composite boom laminate having overwrapped laminate edges by the method illustrated in FIGS. 2A and 2B disposed in the tubular condition.
Figure 9:
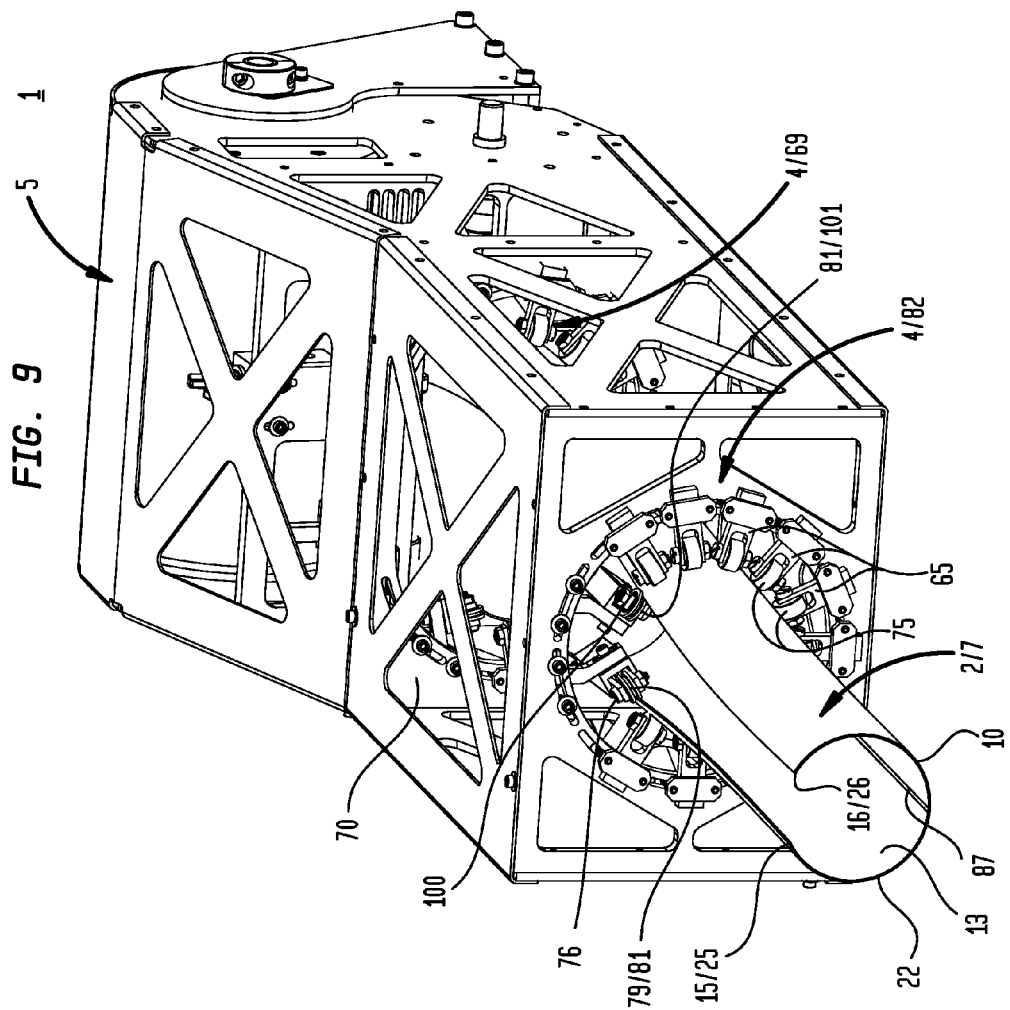
FIG. 9 is a perspective front view of a particular embodiment of the inventive deployment system for supported retractable extension of a composite boom.

For the purposes of this invention, the term "tubular condition" means as to the entire boom length (11), or as to a portion of the boom length (11), the boom (2) has a boom internal surface (13) having an amount of curvature and without limitation to the foregoing broad definition, the illustrative examples of FIGS. 2C and 3C show the boom internal surface (13) as having a generally circular arc (14) between a boom first longitudinal edge (15) disposed adjacent to a boom second longitudinal edge (16) (as shown in the example of FIG. 4); however, the illustrative examples are not meant to preclude embodiments of the tubular condition (7) which do not have a generally circular arc between the boom first longitudinal edge (15) and the boom second longitudinal edge (16) or which do not dispose the boom first longitudinal edge (15) adjacent the boom second longitudinal edge (16).

Now referring primarily to FIGS. 2A and 2B and FIGS. 3A and 3B, as to particular embodiments, the boom (2) can be provided as a laminate (17) constructed by uniting two or more layers of laminable material (18) together. The process of creating a laminate (17) can include impregnating or applying an adherent material (19) in or between the layers of laminable material (18). Sufficient heat (20) or pressure (21), or both, can be applied to the layers of laminable materials (18) and the adherent material (19) to produce the laminate (17). Heat (20) can be applied in a range of between about 10 degrees centigrade ("° C.") to about 400° C. and pressure (21) can be applied in a range of between about 15 pounds per square inch ("psi") to about 50,000 psi depending upon the composition, number, thickness, size, porosity, or other factors relating to the layers of laminable materials (18); the source of pressure (21) (whether vacuum pressure, atmospheric pressure, mold pressure, or the like); or the source of heat (20) (whether applied directly through a mold, or indirectly from a remote heat source). As to particular embodiments, the laminate (17) can be formed about a mold to yield the tubular condition (7) having the boom internal surface (13) defining the desired arcuate form or curvature or circular arc of radius (14) disposed between boom first and second longitudinal edges (15)(16) in a desired radius, degree angle, or amount of overlap. See also: the description included in International Application No. PCT/US2013/071266, hereby incorporated by reference herein.

The layers of laminable material (18) used to produce the laminate (17) of the boom (2) can be in the form of discrete or woven fibers including or consisting of, as illustrative examples: boron carbide fibers, silicon carbide fibers, alumina fibers, alumina titanium fibers, carbon fibers, para-aramid fibers such as KEVLAR®, polypropylene such as INNEGRA®, a ultra-high molecular weight polyethylene such as DYNEEMA® or SPECTRA®, s-glass, e-glass, polyester, or the like, or combinations thereof.

The layers of laminable material (18) can be coated or impregnated with an amount of adherent material (19) having suitable mechanical characteristics, including or consisting of, as illustrative examples: a phenolic, an epoxy, a polyethylene a terephtalate, a vinylester, bis(maleimide/ diallybisphenol A, a cyanate ester, a nylon, a polypropylene, polyethylene terephthalate, polyethersulfone, polyetheretherketone, acrylonitrile butadiene styrene, a polyamide, a polyethylene, a thermoplastic urethane, or the like, which can be either catalytically or thermally set, or combinations thereof.

Now referring primarily to FIGS. 2C, 3C and 4, which show an illustrative example of a particular embodiment of a boom (2) having a boom length (11) disposed between a root end (9) and a tip end (10). The boom (2) can be made of a laminate (17), as above described, which interconverts along the boom length (11) between the planate condition (6) and the tubular condition (7). While the tubular condition (7) as shown in FIGS. 2C and 3C provides boom internal and external surfaces (13)(22) which define a generally circular arc of radius (14) radially disposed about a boom central longitudinal axis (23) of about 360 degrees between the boom first longitudinal edge (15) and the boom second longitudinal edge (16); the invention can provide a wide variety of other embodiments depending upon the application, including a generally circular arc of radius (14) between the boom first and second longitudinal edges (15) (16) of between about 90 degrees and about 360 degrees. As to particular embodiments of the boom (2) in the tubular condition (7), the boom first and second longitudinal edges (15)(16) may be disposed to allow a part of the boom internal surface (13) and a corresponding part of the boom external surface (22) to overlap (24) (as shown in broken line in the example of FIG. 4).

Now referring primarily to FIGS. 2A through 2C, as to particular embodiments of the boom (2), the boom first and second longitudinal edges (15)(16) can, but not necessarily, be provided as boom first and second overwrapped longitudinal edges (25)(26) which avoid or reduce fraying associated with non-overwrapped edges. The production of boom first and second overwrapped longitudinal edges (25) (26) can be accomplished by disposing a first laminable material (27) having one or more laminable layers (28), as above described, in a substantially flat unfolded condition (30) (as shown in the example of FIG. 2A). A second laminable material (29) having one or more laminable layers (28) can be engaged to a medial portion (31) of the first laminable material (27) disposed in the flat unfolded condition (30) defining remaining first and second end portions (32)(33) of the first laminable material (27). The first end portion (32) of the first laminable material (27) can be folded proximate a second laminable material first edge (34) of the second laminable material (29) and disposed in overlaying engagement on the second laminable material (29) to overwrap the second laminable material first edge (34). The second end portion (33) of the first laminable material (27) can be folded proximate a second laminable material second edge (35) of the second laminable material (29) and disposed in overlaying engagement on the second laminable material (29) to overwrap the second laminable material second edge (35). The second laminable material first and second edges (34)(35) overwrapped by the first laminable material (27) can be impregnated with an amount of adherent material (19), as described above, or the amount of adherent material (19) can be applied to the second laminable material (29) overwrapped by the first laminable material (27) (as shown in the example of FIG. 2B). Sufficient heat (20) or pressure (21), or both, can be applied to the first and second laminable materials (27)(29) and the adherent material (19), as above described, to achieve a laminate (17) having a boom first overwrapped longitudinal edge (25) and boom second overwrapped longitudinal edge (26) (as shown in the example of FIG. 2B).

Now referring primarily to FIGS. 3A through 3C, an alternate method of producing boom first and second overwrapped longitudinal edges (25)(26) can be accomplished by obtaining a first laminable material (27) having one or more laminable layers (28), as above described, in the form of a tubular laminable material (36) (as shown in the example of FIG. 3A). A second laminable material (29) having one or more laminable layers (28) can be insertingly engaged within the tubular laminable material (36). The combination of the second laminable material (29) overwrapped by the tubular laminable material (36) can be impregnated with an amount of adherent material (19), as described above, or the adherent material (19) can be applied to the second laminable material (29) overwrapped by the tubular laminable material (36), as above described. Sufficient heat (20) or pressure (21), as above described, can be applied to the laminable materials (29)(36) and the adherent material (19) to produce a laminate (17) having a boom first overwrapped longitudinal edge (25) and boom second overwrapped longitudinal edge (26) (as shown in the example of FIG. 3B).

Now referring primarily to FIGS. 2A through 2C, 3A through 3C, and 5 through 8, the laminate (17) can have a structure which acts to bias the laminate configuration toward either the planate condition (6) or the tubular condition (7). As an illustrative example, the laminate (17) can further include a plurality of crossed fibers (37) disposed in or parallel to the plane of the laminate (17) with each of the plurality of crossed fibers (37) being at an angle between 0 degrees and 90 degrees to a first laminate axis (38). The plurality of crossed fibers (37) can be resiliently disposed in the laminate (17) and upon bending, stretching, or being compressed, can return toward their original unbent, unstretched, or uncompressed condition, which in turn can create a bias in the laminate (17) to return toward the tubular condition (7) (or toward the planate condition (6)). Depending upon the embodiment, the planate condition (6) or the tubular condition (7), or both, can provide a stable condition in which the laminate (17) remains in a fixed planate condition (6) or fixed tubular condition (7). As to particular embodiments, the stable condition can exist even though the laminate (17) has stored sufficient mechanical energy in achieving the planate condition (6) or the tubular condition (7) to return toward the opposite condition upon sufficient forcible urging to initiate interconversion by releasing the stored mechanical energy. As to other embodiments, the laminate (17) in the planate condition (6) or the tubular condition (7) can be in a non-stable condition in which an amount of force maintains the laminate (17) in the planate condition (6) or in the tubular condition (7) and in the absence of the amount of force, the laminate initiates interconversion toward the opposite condition.

Now referring primarily to FIGS. 5 through 8, as to particular embodiments, the tubular condition (7) can, but need not necessarily, include a first arcuate longitudinal edge portion (90) extending along the boom length (11) configured to project the boom first longitudinal edge (15) either away from or toward the boom central longitudinal axis (23) of the tubular condition (7). The tubular condition (17), can but need not necessarily, include a second arcuate longitudinal edge portion (91) extending along the boom length

(11) of the tubular condition (17) configured to project the boom second longitudinal edge (16) either away from or toward a boom central longitudinal axis (23). While FIGS. 5 through 8 depict both the first and second arcuate longitudinal edge portions (90)(91) projecting the corresponding boom first and second longitudinal edges (15)(16) either away from the boom central longitudinal axis (23) (as shown in the example of FIGS. 5 and 7) or toward the boom central longitudinal axis (23) (as shown in the example of FIGS. 6 and 8), this does not preclude various embodiments of the tubular condition (7) having only one of the first or second arcuate longitudinal edge portions (90)(91) configured to project the corresponding boom first or second longitudinal edge (15)(16) either inward or outward of the boom central longitudinal axis (23), or includes both first or second arcuate longitudinal edge portions (90)(91) configured to project the corresponding boom first or second longitudinal edge (15)(16) in opposite directions with one inward and one outward of the boom central longitudinal axis (23). The first and second arcuate longitudinal edge portions (90)(91) of the tubular condition (7) can have a lesser arc radius (92) than the medial longitudinal portion (93) of the tubular condition (7) disposing the first or second arcuate longitudinal edge portions (90)(91) in a plane that increases axial stiffness (increases resistance to axial bending) along the boom length (11) of the tubular condition (7). The lesser arc radius (92) and the plane in which the first and second arcuate longitudinal edge portions (90)(91) are disposed can be pre-selected to increase axial stiffness of the tubular condition (7) as required for a particular application and concurrently allow the tubular condition (7) including the first and second arcuate longitudinal edge portions (90)(91) to interconvert between the tubular condition (7) and the planate condition (6).

Now referring primarily to FIGS. 14 through 17, as to particular embodiments, the laminate (17) can be disposed in a substantially unstable planate condition (6) which can be subsequently established in the rolled condition (8) in which the laminate (17) concentrically winds about a roll axis (39). As to particular embodiments, the rolled condition (8) can be a stable rolled condition (8) in which the stored mechanical energy within the laminate (17) does not exert radial or axial forces sufficient to spontaneously unroll, uncoil, or unfurl the laminate (17). As to particular embodiments, the planate condition (6) of the boom (2) can be concentrically wound into the rolled condition (8) commencing from the root end (9) to generate a first winding of the rolled condition (8), and with continued rotation of the rolled condition (8) at the root end (9), the tip end (10) can be drawn toward the root end (9). Upon extension of the laminate (17) from the rolled condition (8), the laminate (17) can spontaneously return toward the tubular condition (7). As to particular embodiments, a spool (40) can be coupled to the root end (9) about which the planate condition (6) of the boom (2) can be wound. Depending upon the direction of rotation of the spool (40), the planate condition (6) of the boom (2) can be concentrically wound about or unwound from the spool (40) to correspondingly extend or retract the tip end (10) of the boom (2). As to particular embodiments, the spool (40) can be made responsive to a spool winder (41) (whether a hand crank, a motor, or other winder element) which can rotate the spool (40) to concentrically wind the planate condition (6) about the spool (40) to retract or extend the tip end (10) of the boom (2).

Again referring primarily to FIGS. 14 through 17, as to particular embodiments, the deployer (3) can, but need not necessarily, include a boom drive assembly (42) which engages the boom internal surface (13) or the boom external surface (22) to operationally extend or retract the boom (2) from the rolled condition (8). As one example, the planate condition (6) of the boom (2) can be engaged with at least one driven rotatable member (43). The at least one driven rotatable member (43) can be disposed to sufficiently engage the internal surface (13) or the external surface (22) of the planate condition (6) of the boom (2) such that upon rotation of the driven rotatable member (43), the planate condition (6) of the boom (2) travels in relation to the driven rotatable member (43) resulting in extension or retraction of the boom (2). As to particular embodiments, the boom drive assembly (42) can, but need not necessarily, include at least one idler member (44) disposed in opposed relation to the driven rotatable member (43). The planate condition (6) of the boom (2) can be disposed between the driven rotatable member (43) and the idler member (44). The distance between the driven rotatable member (43) and the idler member (44) can be adjusted to engage the driven rotatable member (43) with the external surface (22) or the internal surface (13) of the boom (2) to allow extension or retraction of the boom (2) upon rotation of the driven rotatable member (43). As to particular embodiments, the idler member (44), can, but need not necessarily, include an idler rotatable member (94) having an idler perimetrical face (95) which engages the internal surface (13) or the external surface (22) of the boom (2) opposite the driven rotatable member (43).

As to particular embodiments, the driven rotatable member (43) can be frictionally engaged with the boom internal or external surface (13)(22) of the planate condition (6). In the case of a frictionally engaged driven rotatable member (43), the driven rotatable member (43) can, but need not necessary, include a friction band (96) which terminates at a driven perimetrical face (97) of the driven rotatable member (43) to increase the coefficient of friction between the driven perimetrical face (97) of the driven rotatable member (43) and the engaged internal or external surface (13)(22) of the boom (2). The friction band (96) can be an elastomeric material such as silicone rubber, or abrasive material such as diamond or silicon carbide grit, or a patterned surface of raised elements such as a knurling pattern, or the like, or combinations thereof.

Figure 15:
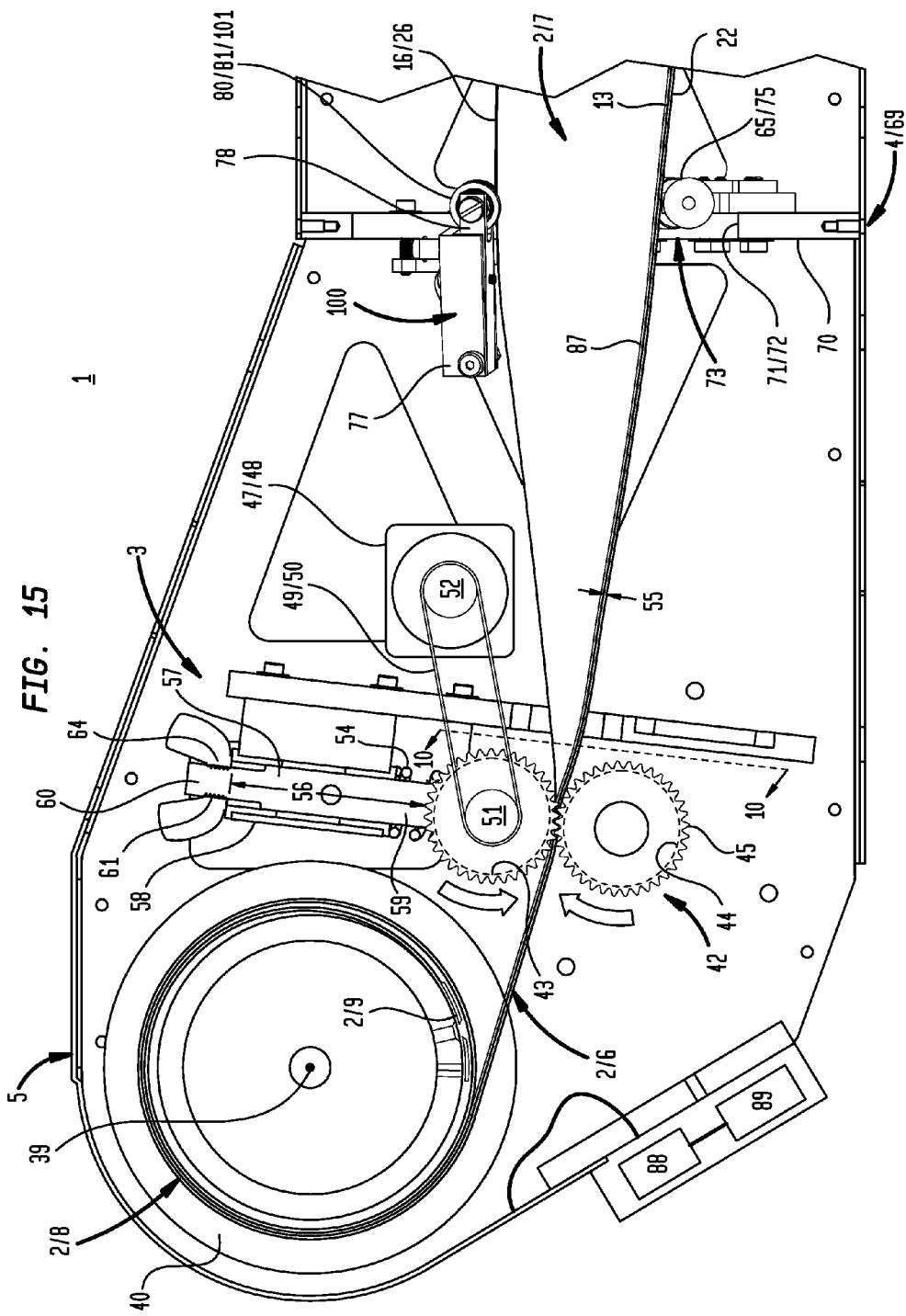
FIG. 15 is an enlarged view of a portion of the particular embodiment of the inventive deployment system for supported retractable extension of a composite boom shown in FIG. 14.
Figure 16:
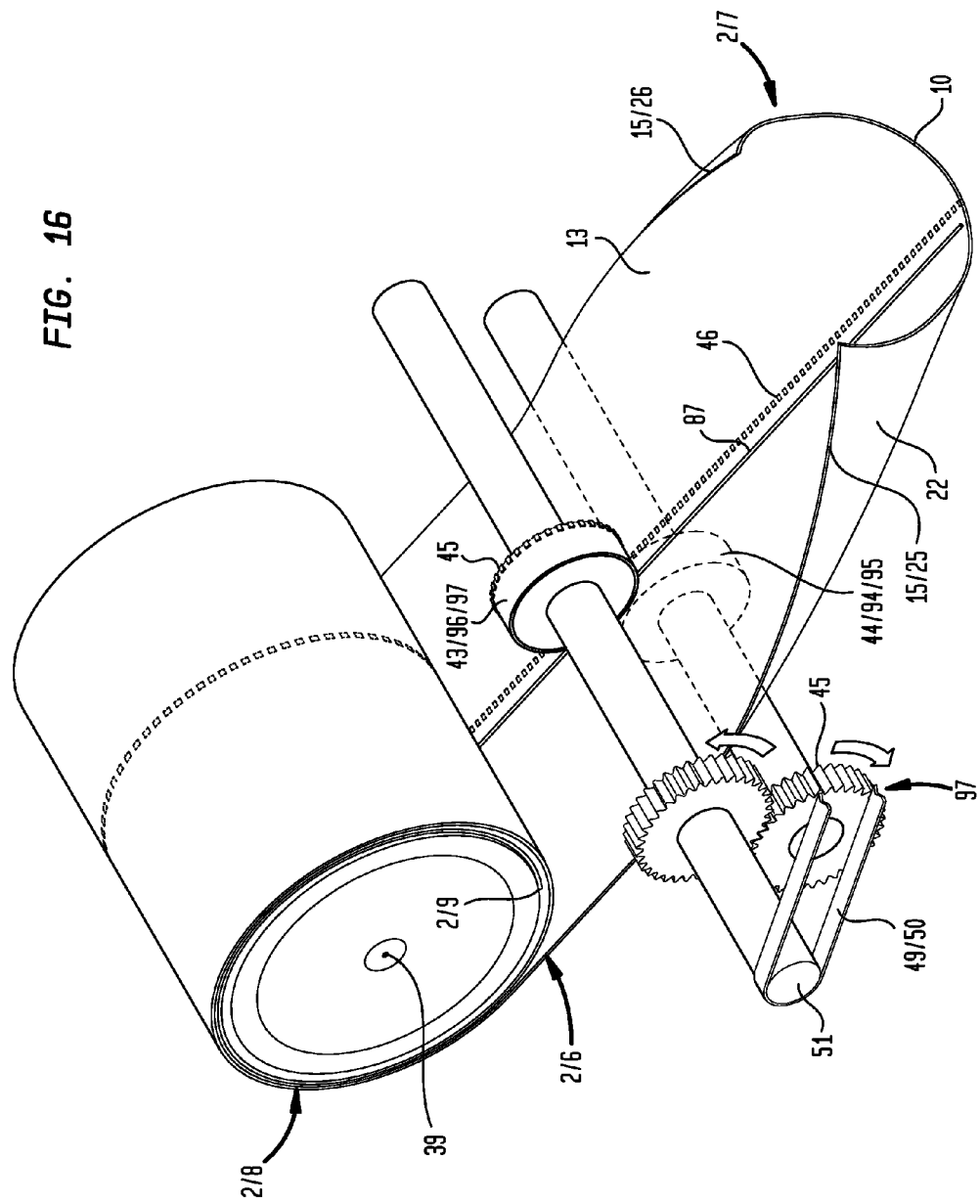
FIG. 16 is a perspective view of a portion of the particular embodiment of the inventive deployment system for supported retractable extension of a composite boom shown in FIG. 15.

Now referring primarily to FIGS. 15 and 16, the driven rotatable member (43) can, but need not necessarily, include a plurality of teeth (45) disposed in circumferentially spaced apart relation about the driven perimetrical face (97) of the driven rotatable member (43), or the idler rotatable member (94), and the boom (2) can further include a plurality of drive apertures (46) disposed in linear teeth-engaging relation along the boom length (11) of the boom (2). Rotation of the driven rotatable member (43) results in serial insertion of each of the plurality of teeth (45) into a corresponding one of a plurality of drive apertures (46) disposed in longitudinal linear spaced apart relation along a portion of the entire boom length (11) between the root end (9) and the tip end (10) to generate travel of the planate condition (6) in relation to the driven rotatable member (43).

Again referring primarily to FIGS. 15 and 16, the boom drive assembly (42) can, but not necessarily, include a drive (47) (shown as an electric motor (48) in the example of FIG. 15) which operates to rotate the driven rotatable member (43) whether directly, or indirectly, through a drive transmission assembly, such as a circuitous drive member (49) (shown in the example of FIGS. 15 and 16 as a drive belt (50) engaged about a pair of pulleys (51)(52) correspondingly engaged to the drive (47) and the driven rotatable member (43)).

Figure 14:
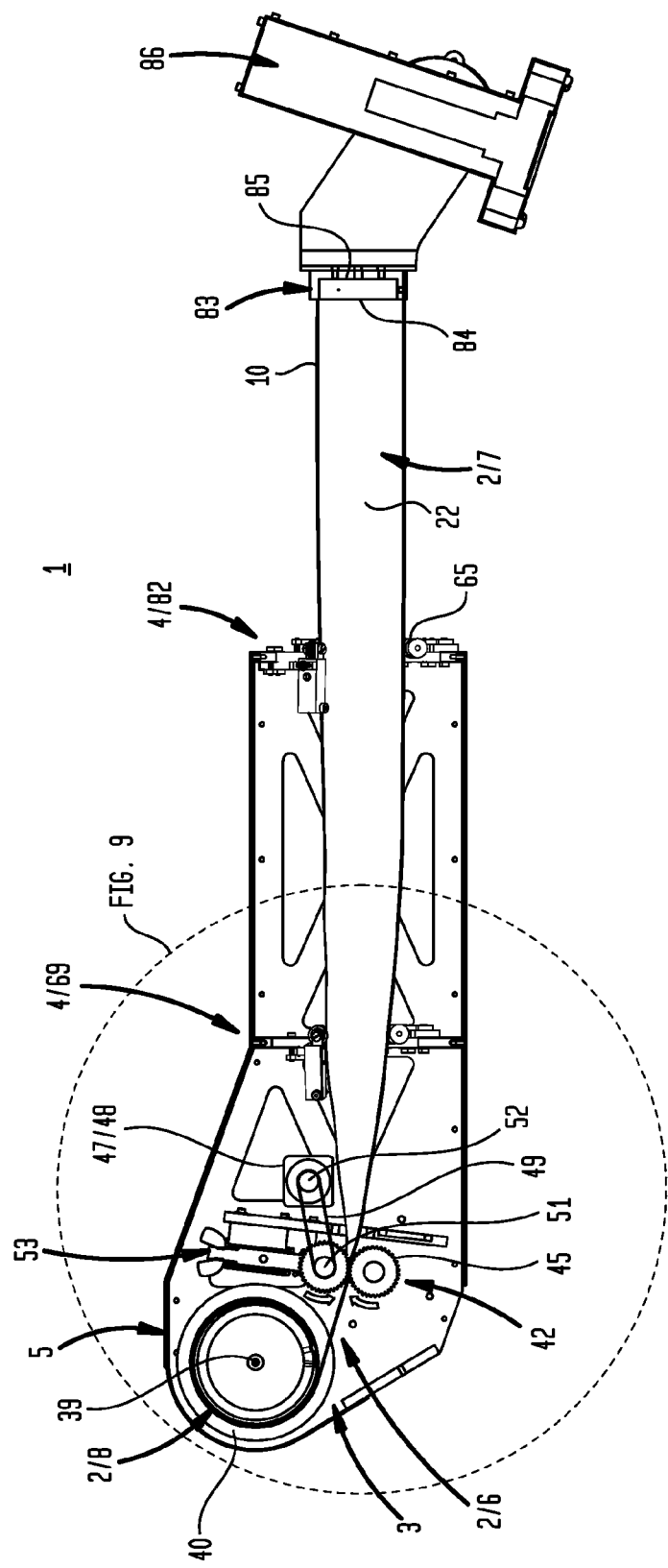
FIG. 14 is a cross sectional view 14-14 of the particular embodiment of the inventive deployment system for supported retractable extension of a composite boom shown in FIG. 13.

Now referring primarily to FIGS. 14 and 15, the boom drive assembly (42) can, but need not necessarily, include a rotatable member location adjustment assembly (53) which operates to adjust the distance between the driven rotatable member (43) and the idler member (44) or idler rotatable member (94). Compression forces developed in a coil spring (54) can be applied to the driven rotatable member (43) (or idler member (44)) to maintain frictional engagement or serial engagement of the plurality of teeth (45) in the corresponding plurality of drive apertures (46) along the boom length (11) and allow for some movement of the driven rotatable member (43) (or the idler member (44)) in response to differences in laminate thickness (55) of the laminate (17) of the boom (2). Compressive forces can be developed in the coil spring (54) by adjustment of an effective length (56) of an elongate slide member (57) passing through the coil spring (54) and disposed within a slide member housing (58). As to particular embodiments, the effective length (56) of the elongate slide member (57) can be shortened or lengthened by operation of a slide member collar (64) coupled at a slide member first end (59). As to particular embodiments, the slide member collar (64) can contact the slide member housing (58) and be variably positioned along the elongate slide member (57) to draw a slide member second end (60) against the coil spring (54). As shown in the illustrative example of FIG. 9, the slide member collar (64) and the elongate slide member (57) proximate the slide member first end (59) can provide mated spiral threads (61) which allow the slide member collar (64) to be rotatably positioned proximate the slide member first end (59).

Figure 17:
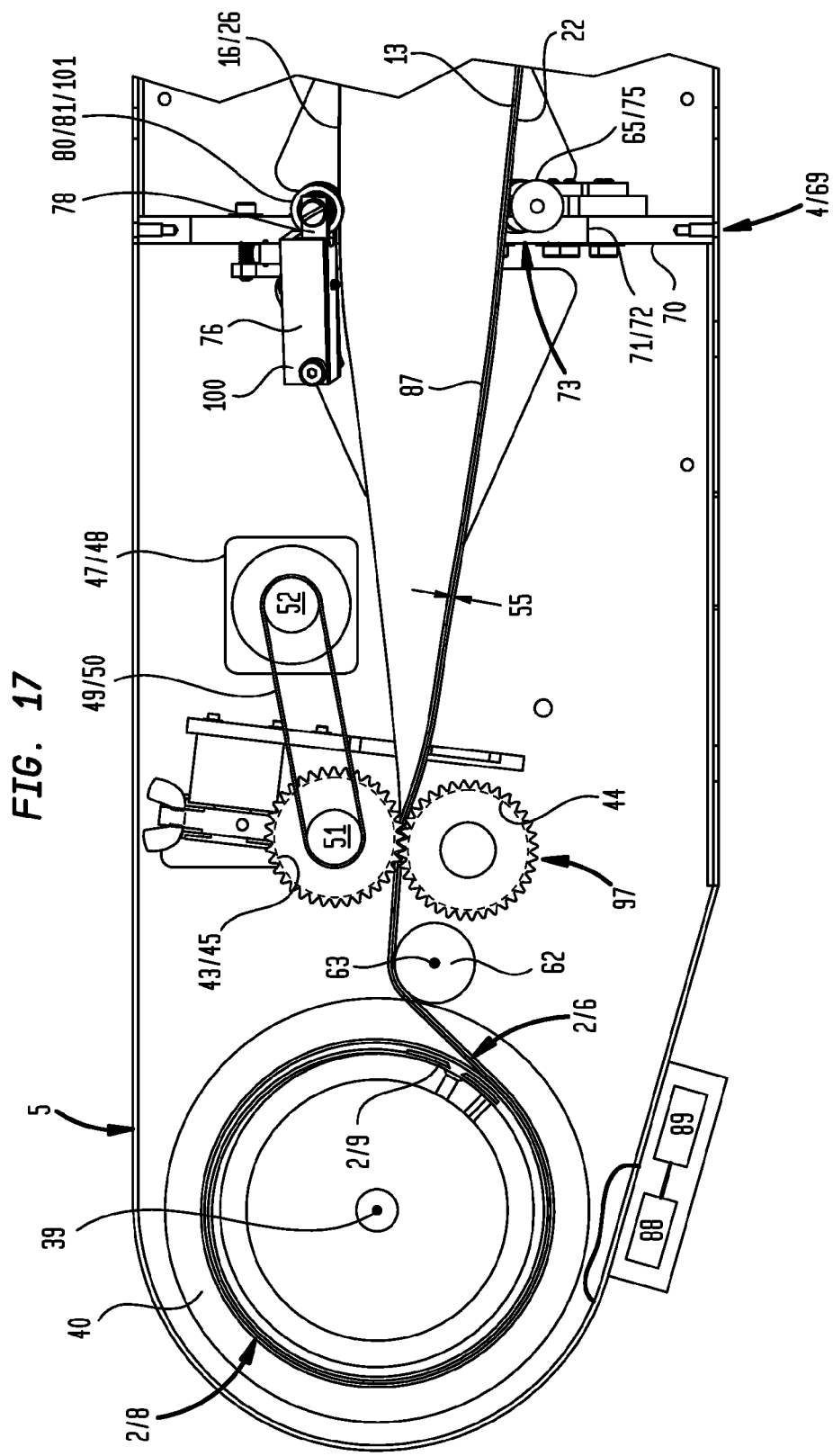
FIG. 17 is a cross sectional view 17-17 of the particular embodiment of the inventive deployment system for supported retractable extension of a composite boom shown in FIG. 13.

Now referring primarily to FIG. 17, embodiments of the boom drive assembly (42) can, but need not necessarily, include a boom guide member (62) which engages the boom external surface (22) of the planate condition (6) of the boom (2) to bend the planate condition (6) to align the portion of planate condition (6) proximate the root end (9) with the boom drive assembly (42). As to particular embodiments, the boom guide member (62) can have a cylindrical configuration which rotates about a drive assembly guide member axis (63) located to allow the planate condition (6) of the boom (2) to be sufficiently bent to allow the spool (40) to be operably located within the deployer housing (5) to reduce the volume or otherwise allow for varied configurations of the deployer housing (5) depending upon the application.

Figure 18:
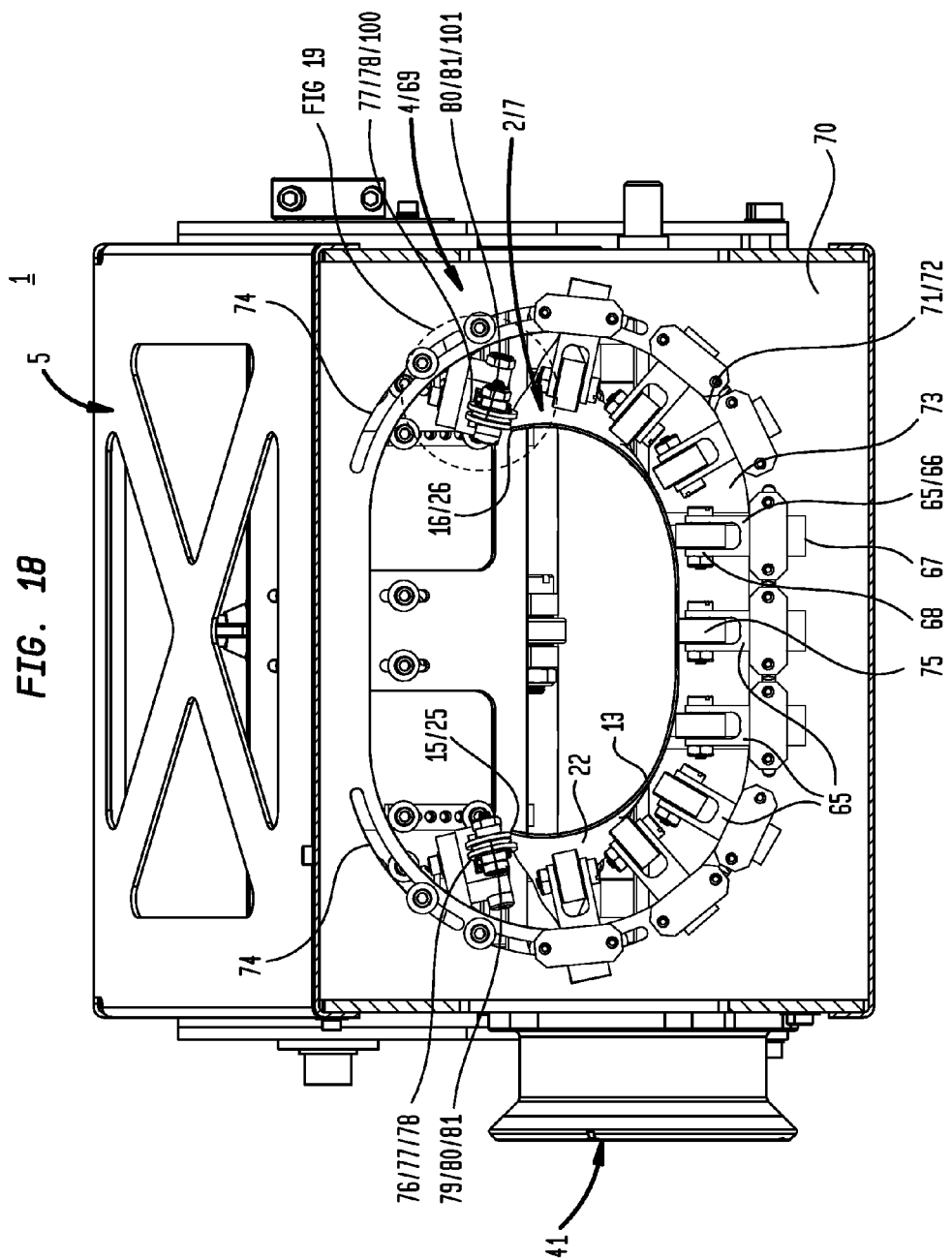
FIG. 18 is a cross sectional view 18-18 of the composite boom shown in FIG. 13.
Figure 21:
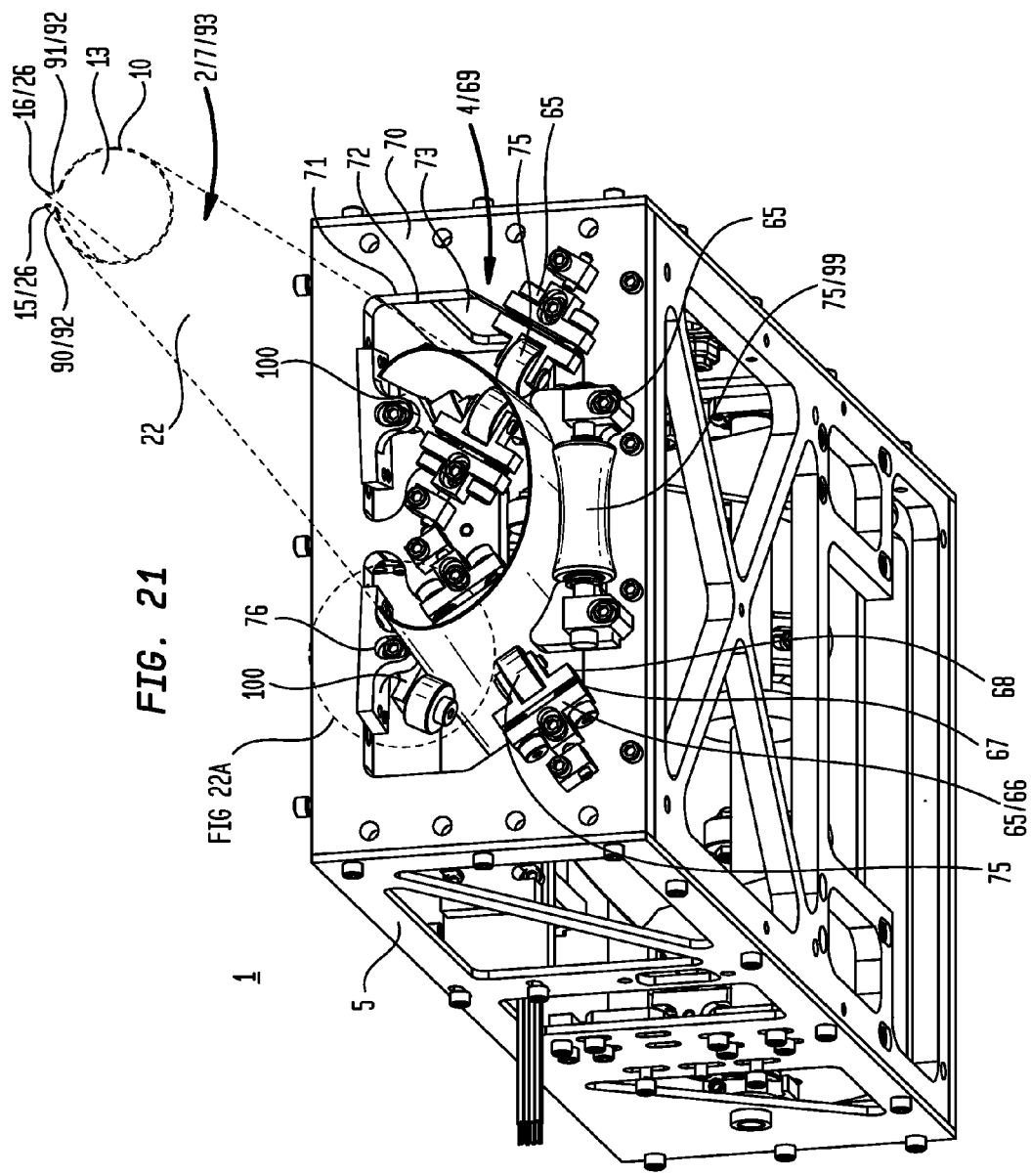
FIG. 21 is a perspective view of a particular embodiment of the inventive deployment system for supported retractable extension of a composite boom.
Figure 22A:
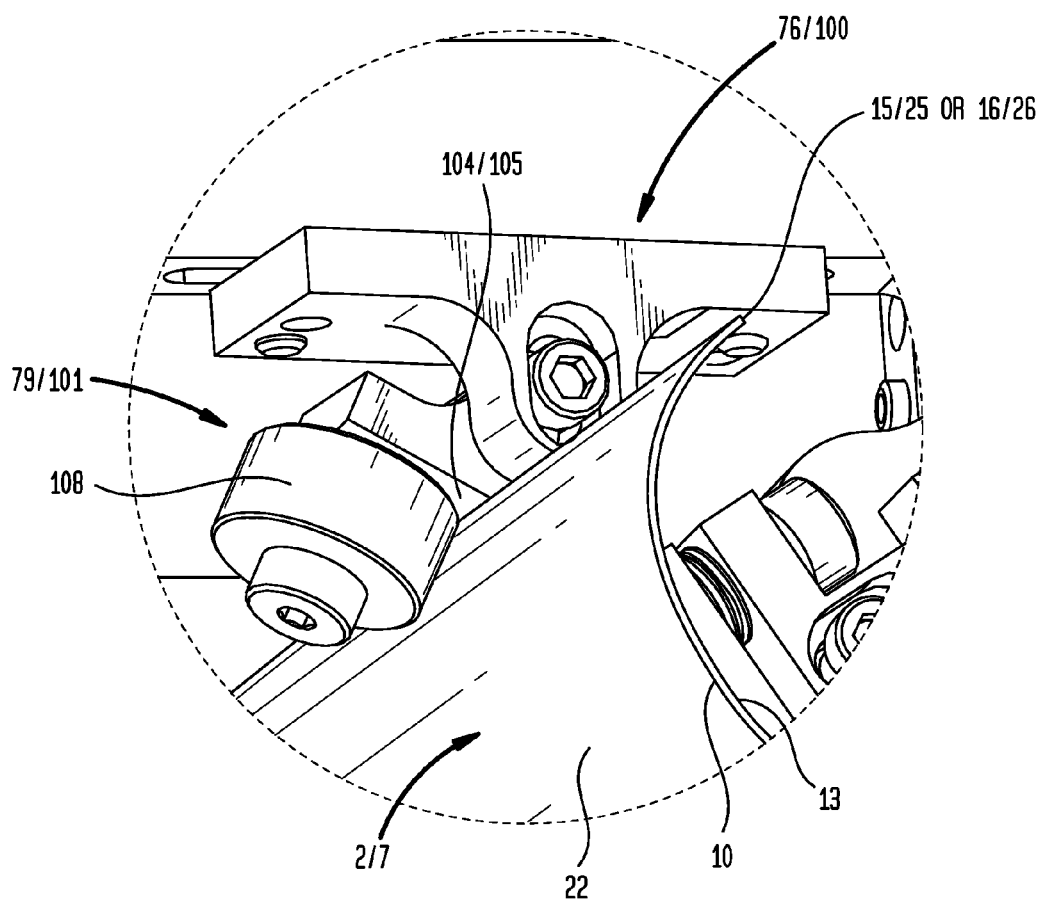
FIG. 22A is an enlarged view of the particular embodiment of the first or second edge guide member shown in FIG. 21.
Figure 22B:
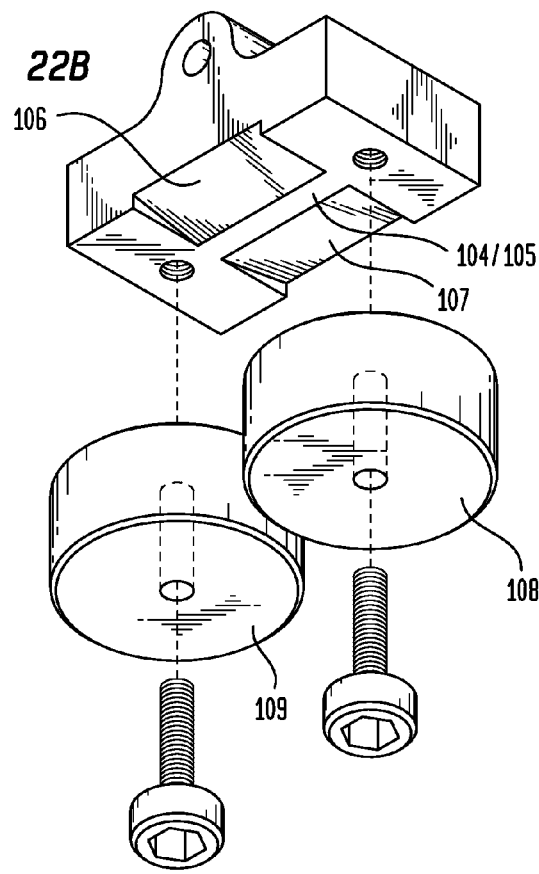
FIG. 22B is an exploded view of the particular embodiment of the first or second edge guide member shown in FIGS. 21 and 22A.
Figure 22C:
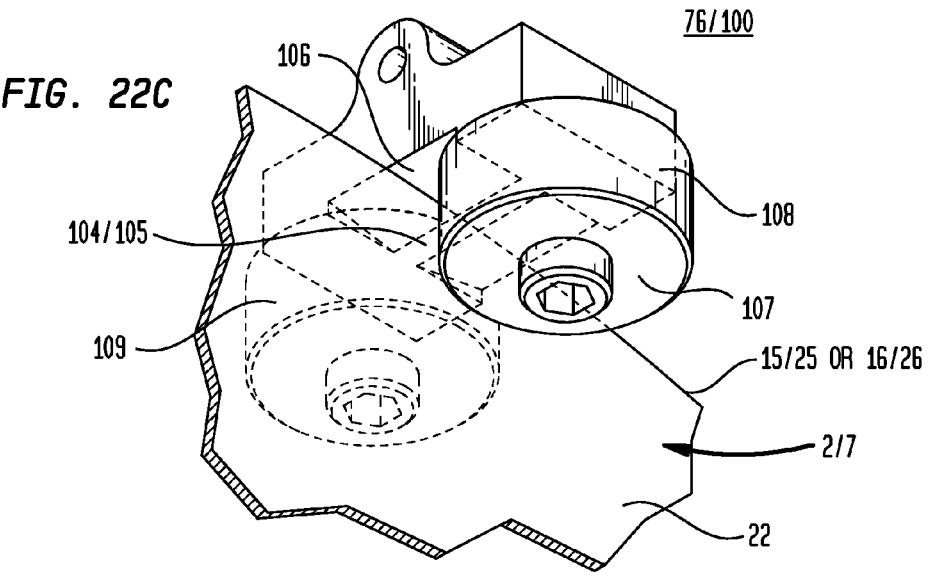
FIG. 22C is an enlarged view of the particular embodiment of the first or second edge guide member shown in FIG. 21.
Figure 22D:
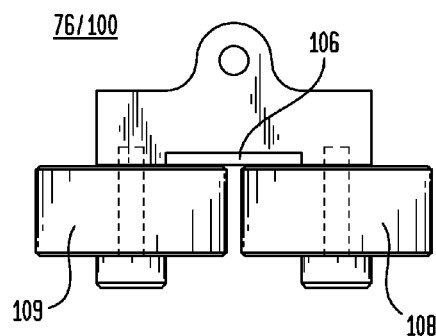
FIG. 22D is a front elevation view of the particular embodiment of the first or second edge guide member shown in FIG. 21.
Figure 22E:
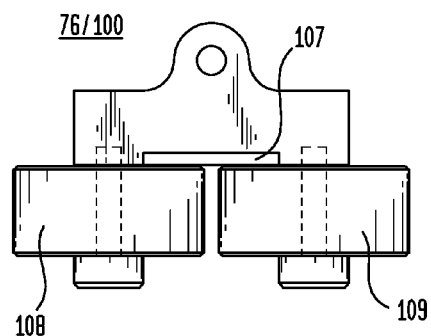
FIG. 22E is a back elevation view of the particular embodiment of the first or second edge guide member shown in FIG. 21.
Figure 22F:
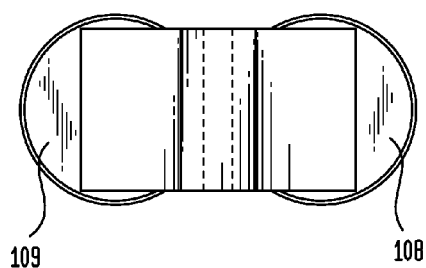
FIG. 22F is a top plan view of the particular embodiment of the first or second edge guide member shown in FIG. 21.
Figure 22G:
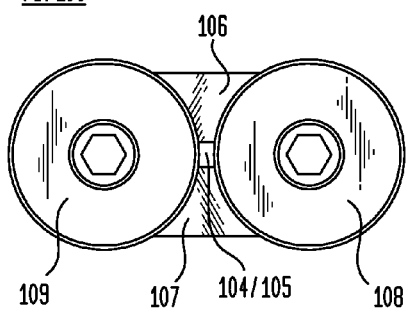
FIG. 22G is a bottom plan view of the particular embodiment of the first or second edge guide member shown in FIG. 21.
Figure 22H:
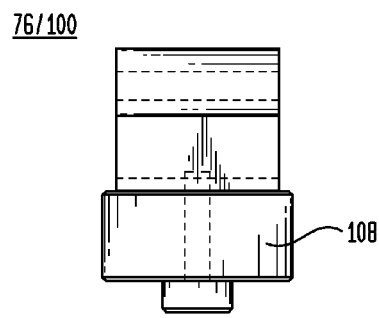
FIG. 22H is a first side elevation view of the particular embodiment of the first or second edge guide member shown in FIG. 21.
Figure 22I:
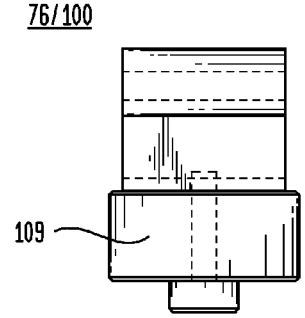
FIG. 22I is a second side elevation view of the particular embodiment of the first or second edge guide member shown in FIG. 21.

Now referring primarily to FIGS. 18 and 21, the deployer (3) can, but need not necessarily, include a support assembly (4). As to particular embodiments, the support assembly (4) can include one or a plurality of support members (65) each having a support member body (66) disposed between a support member first end (67) and a support member second end (68). Each of the plurality of support member first ends (67) can be configured to couple to the deployer housing (5) to dispose each of the plurality of support member second ends (68) in inward radially spaced apart relation to circumferentially engage the boom external surface (22) (as shown in the example of FIG. 18).

Again referring primarily to FIGS. 18 and 21, one or more of the plurality of support members (65) can, but need not necessarily, be disposed with the support member second end (68) disposed in outwardly radially spaced apart relation to circumferentially engage the boom internal surface (13).

Figure 20:
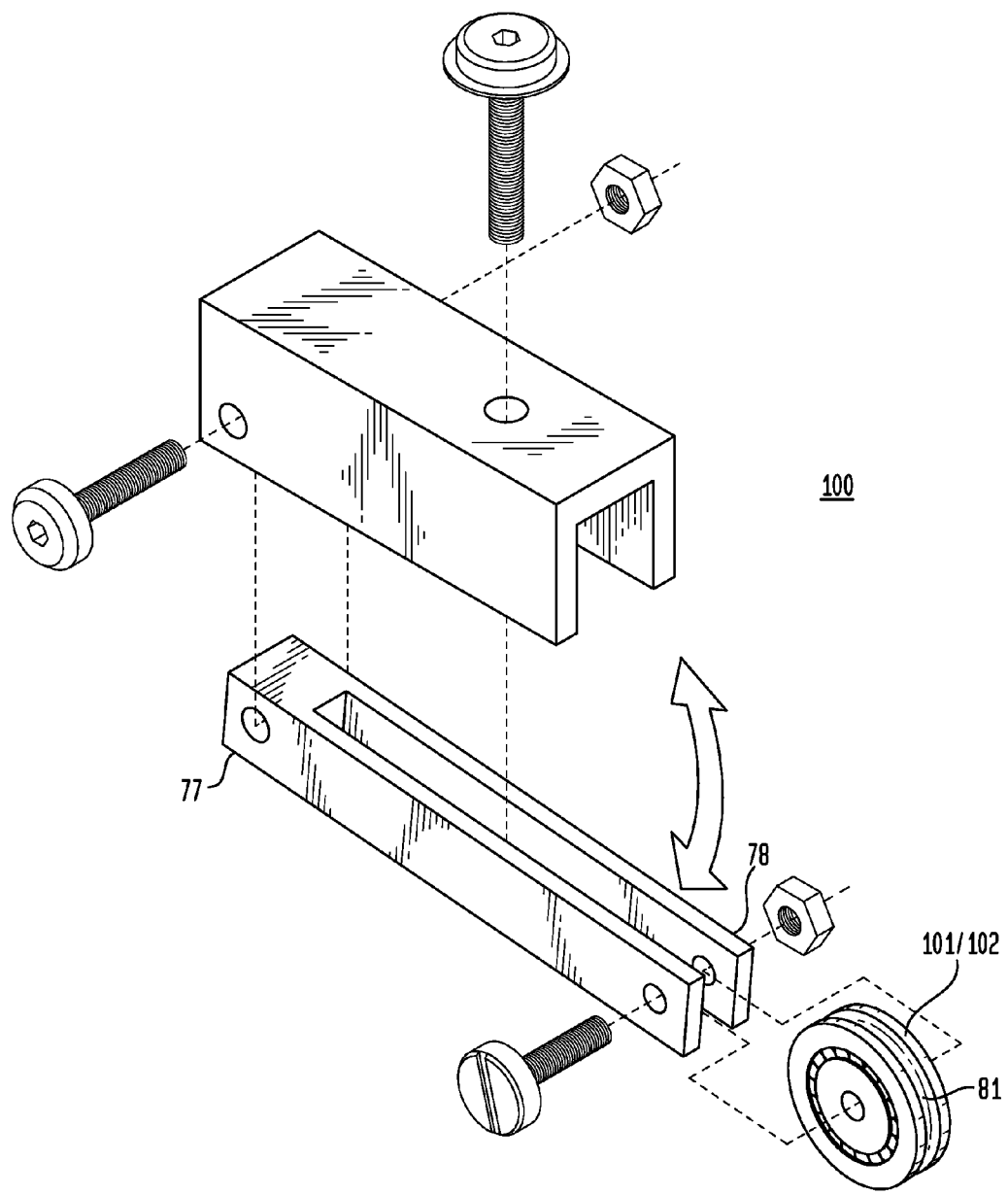
FIG. 20 is an exploded view of the first or second edge guide member shown in FIG. 19.

Again referring primarily to FIGS. 18 and 21, as to particular embodiments, a first support assembly (69) can, but need not necessarily, include a first cross plate (70) having a first cross plate aperture element (71) with a first cross plate aperture element periphery (72) which bounds a first central aperture (73). The first cross plate (70) can be disposed in generally perpendicular relation to the boom central longitudinal axis (23) of the boom (2). The boom (2) can pass through the first central aperture (73). The first cross plate (70) can, but need not necessarily, include one or more first cross plate arcuate slots (74) disposed in generally parallel relation to the first cross plate aperture element periphery (72) of the first cross plate aperture element (71). One or more of the support member first ends (67) can be mechanically fastened to slidably adjust in relation to one of the first cross plate arcuate slots (74) to allow adjustable radially spaced apart relation between the plurality of support members (65) (as shown in the example of FIG. 20).

Again referring primarily to FIGS. 18 and 21, as to particular embodiments, each support member body (66) can, but need not necessarily, be configured to mechanically fasten in adjustable inwardly radially extensible relation to the first aperture element periphery (72) of the first cross plate aperture element (71) to conform the plurality of support member second ends (68) to the configuration of the boom external surface (22) of the boom (2) at the location of the first cross plate (70) in the deployer housing (5).

Accordingly, as to particular embodiments, the plurality of support member second ends (68) can be configured and adjusted to allow slidable engagement with the boom external surface (22), or the boom internal surface (13), or both the boom internal surface (13) and the boom external surface (22) during retractable extension of the boom (2) from the rolled condition (8).

Again referring primarily to FIGS. 18 and 21, one or more of the support member second ends (68) can, but need not necessarily, include a rotatable support member (75) disposed to supportingly engage the boom external surface (22). One or more of the rotatable support members (75) can, but need not necessarily, include a contoured perimetrical face (99) which conformingly engages the boom external surface (22) of the boom (2). As shown in the example of FIG. 21, the contoured perimetrical face (99) of the rotatable support member (75) can have a contour which allows substantially continuous abutting engagement across the width of the contoured perimetrical face (99) with the boom external surface (22). Referring primarily to FIG. 21, one or more of the plurality of support members (65) can, but need not necessarily, include a pair of rotatable support members (75) disposed in opposed relation a distance apart to correspondingly engage the boom external surface (22) and the boom internal surface (13).

Again referring primarily to FIGS. 18 and 21, the first support assembly (69) can, but need not necessarily, include a first or a second boom edge guide member (76)(100). The first or second boom edge guide members (76)(100) can each have a corresponding guide member first end (77) and guide member second end (78) adjustably configured as above described for the one or more support members (65). As to particular embodiments, each of the first or second boom edge guide members (76)(100) can have a boom longitudinal edge receiving element (79)(101) in which a boom first or second longitudinal edge (15)(16) or boom first or second overwrapped longitudinal edge (25)(26) slidely engages during retractable extension of the boom (2). The boom longitudinal edge receiving elements (79)(101) can be disposed to correspondingly secure the boom first or second longitudinal edge (15)(16) or boom first or second overwrapped longitudinal edge (25)(26) in fixed relation to the first support assembly (69) to maintain the boom external surface (22) in a generally consistent configuration during retractable extension of the boom (2) and which can afford a more consistent configuration of the boom (2) for engagement with the plurality of support members (65).

Figure 19:
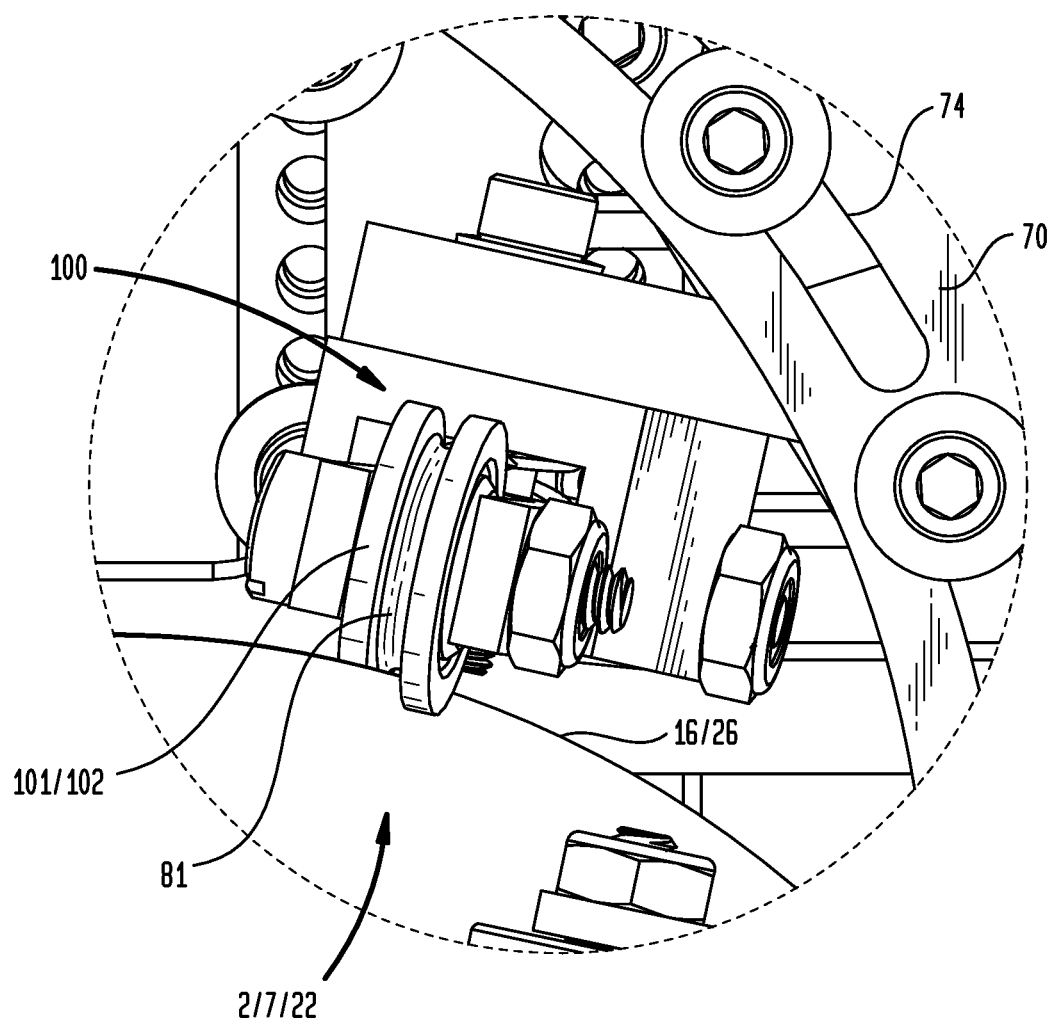
FIG. 19 is an enlarged view of the first or second edge guide member shown in FIG. 18.

Now referring primarily to FIGS. 19 and 20, as to particular embodiments, the boom longitudinal edge receiving elements (79)(101) can be configured as rotatable guide members (80)(102) each having an annular groove (81) which correspondingly receives the boom first and second longitudinal edges (15)(16) or boom first and second overwrapped longitudinal edges (25)(26).

Now referring primarily to FIGS. 21 and 22A through 22I, as to particular embodiments, the first or second boom edge guides (76)(100) can, but need not necessarily, each include a boom longitudinal edge receiving element (79)(101) configured as a planar guide face (104)(105) disposed to engage the boom first or second longitudinal edge (15)(16) or boom first or second overwrapped longitudinal edge (25)(26) during retractable extension of the boom (2). As to particular embodiments, each boom longitudinal edge receiving element (79)(101) can, but need not necessarily, further include one or a pair of inclined guide faces (106)(107). Each planar guide face (104)(105) can be disposed adjacent one inclined guide face (106)(107) or medially disposed between a pair of inclined guide faces (106)(107) with the one or pair of inclined guide faces (106)(107) decreasing in distance from the boom first or second longitudinal edge (15)(16) or boom first or second overwrapped longitudinal edge (25)(26) approaching a corresponding planar guide face (104)(105). As to particular embodiments, one or both boom longitudinal edge receiving elements (79)(101) can, but need not necessarily, include a pair of opposed rotatable members (108)(109) disposed in opposed relation to correspondingly engage an internal surface (13) and an external surface (22) of the boom (2) when the boom first or second longitudinal edge (15)(16) or boom first or second overwrapped longitudinal edge (25)(26) engages the planar guide face (104)(105).

Now referring primarily to FIG. 14, a second support assembly (82) can be disposed a distance from the first cross plate (70) and can include all the elements as above described for the first support assembly (69). The guide member second ends (78) can be disposed at a lesser distance apart to correspondingly guide the corresponding boom first and second longitudinal edges (15)(16) (or the boom first and second overwrapped longitudinal edges (25)(26)) at a lesser distance apart as the planate condition (6) of the boom (2) approaches the tubular condition (7) during retractable extension.

Figure 10:
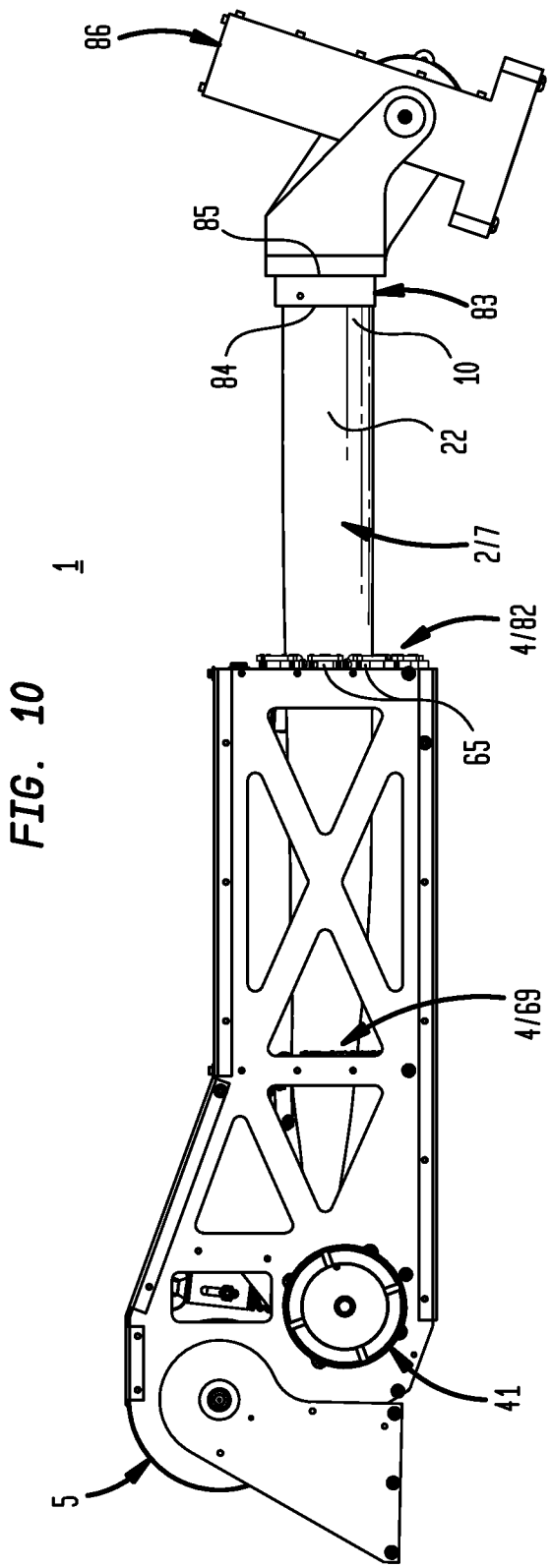
FIG. 10 is a first side view of a particular embodiment of the inventive deployment system for supported retractable extension of a composite boom.
Figure 13:
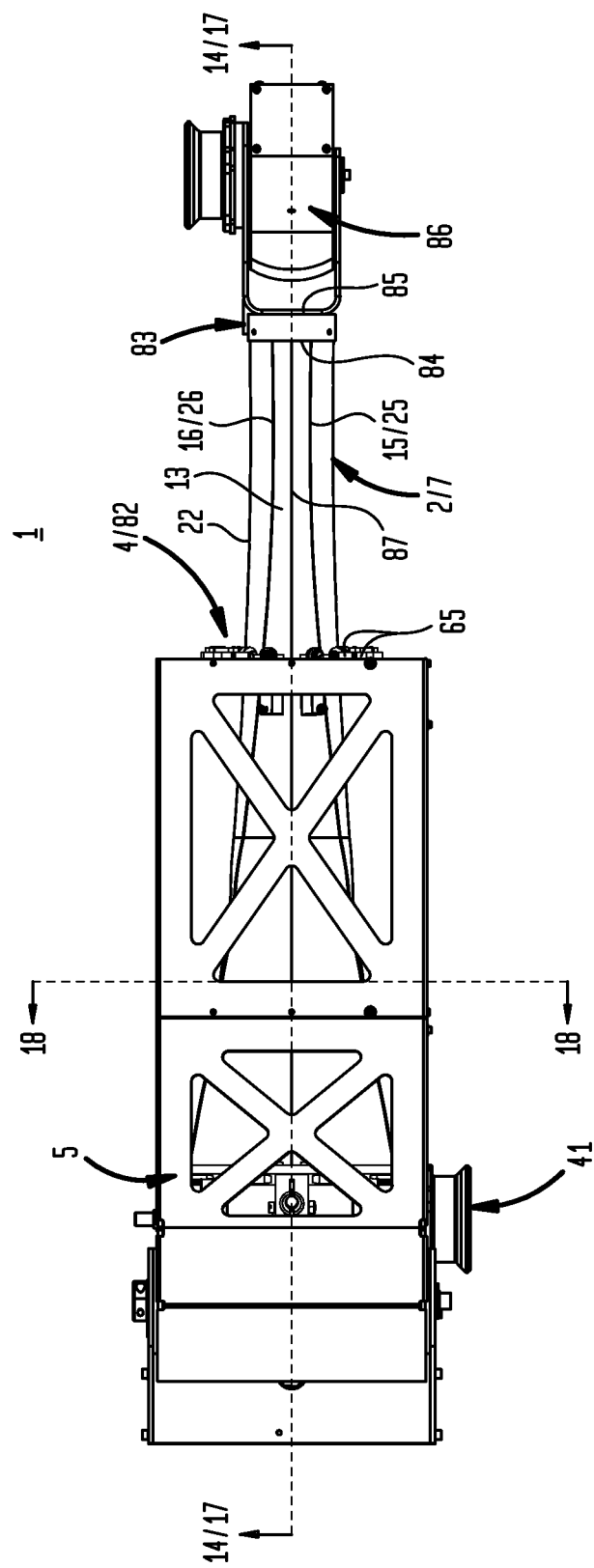
FIG. 13 is a top view of a particular embodiment of the inventive deployment system for supported retractable extension of a composite boom.

Now referring primarily to FIGS. 9 through 20 and 21, the deployer housing (5) can be configured in any manner capable of maintaining in operational fixed relation: the spool (40), the boom drive assembly (42), and at least one support assembly (4) (and as to particular embodiments the first support assembly (69) and the second support assembly (82)), and the boom (2) and can be configured at least as shown in the examples of FIGS. 10 and 14.

Now referring primarily to FIGS. 1, 10, 12, 13, and 14, embodiments of the deployment system (1) can further include a boom collar (83) secured to the tip end (10) of the boom (2). The boom collar (83) can include a collar first end (84) configured for fixed securement with the tip end (10) of the boom (2) in the tubular condition (7). The boom collar (83) can further include a collar second end (85) configured to fixedly secure or releasably secure a mountable object (86). While the mountable object (86) shown in the Figure comprises a camera, this illustrative example is not intended to limit embodiments solely to a camera and any of a numerous variety of mountable objects (86) can be configured to mount to the tip end (10) of the boom (2), such as: lights, sensors, magnetometers, feedhorns, or the like, or combinations thereof. The boom (2) can also be used to perform work, such as deploying a secondary structure like a telescoping tube, sunshade, or other tensegrity style structures, or the like, or combinations thereof.

Now referring primarily to FIGS. 2B, 2C, 3B, 3C, 9, 13, 15, and 17, embodiments of the boom (2) can further include an electrically conductive element (87) disposed on the laminate (17), or contained by, or disposed within or between layers of laminable material (18) of the laminate (17) of the boom (2) to conduct electricity or convey digital data or both between the root end (9) and the tip end (10) of the boom (2). Accordingly, particular embodiments of the electrically conductive element (87) can be provided to connect a power source (88) or to a computer (89) to the mountable object (86) mounted to the tip end (10) of the boom (2). The electrically conductive element (87) can be configured in any manner which allows the boom (2) to interconvert between the planate condition (6) and the tubular condition (7) and have suitable conductance, including, without limitation to the breadth of the foregoing, electrically conductive foil (thin flexible metal), electrically conductive wires or woven strands, or the like.

As can be easily understood from the foregoing, the basic concepts of the present invention may be embodied in a variety of ways. The invention involves numerous and varied embodiments of a deployment system for supported retractable extension of a composite boom and methods for making and using such deployment system including the best mode. International Application Nos. PCT/US2013/071266 and PCT/US2014/16605 are each hereby incorporated by reference herein.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "deployer" should be understood to encompass disclosure of the act of "deploying"—whether explicitly discussed or not—and, conversely, were there effectively disclosure of the act of "deploying", such a disclosure should be understood to encompass disclosure of a "deployer" and even a "means for deploying." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the deployment systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A system, comprising:
    a spool;
    a composite boom which interconverts between a planate condition having a width disposed between a boom first longitudinal edge and a boom second longitudinal edge and a tubular condition having an amount of curvature between said boom first longitudinal edge adjacent said boom second longitudinal edge, said composite boom having a boom length disposed between a root end and a tip end, said planate condition coupled to said spool by said root end, whereby rotation of said spool in a first direction concentrically winds said planate condition of said composite boom about said spool, said tip end extensible from said spool by rotation of said spool in a second direction generating said tubular condition of said composite boom; and
    a first support assembly disposed at a first location along a boom central longitudinal axis to supportingly engage said composite boom as said tip end extends from said spool, said first support assembly having a plurality of support members disposed in circumferentially spaced apart relation corresponding to a curvature of the tubular condition of the composite boom to supportingly engage an external surface of said composite boom.

2. The system of claim 1, wherein said plurality of support members further includes a plurality of rotatable support members disposed in circumferentially spaced apart relation which supportingly engage said external surface of said composite boom.

3. The system of claim 2, wherein one or more of said plurality of rotatable support members includes a perimetrical face contoured to conformingly engage said external surface of said composite boom.

4. A system, comprising:
    a spool;
    a composite boom which interconverts between a planate condition having a width disposed between a boom first longitudinal edge and a boom second longitudinal edge and a tubular condition having an amount of curvature between said boom first longitudinal edge adjacent said boom second longitudinal edge, said composite boom having a boom length disposed between a root end and a tip end, said planate condition coupled to said spool by said root end, whereby rotation of said spool in a first direction concentrically winds said planate condition of said composite boom about said spool, said tip end extensible from said spool by rotation of said spool in a second direction generating said tubular condition of said composite boom; and a first support assembly disposed at a first location along said a boom central longitudinal axis to supportingly engage said composite boom as said tip end extends from said spool, said first support assembly including a pair of rotatable support members, wherein a first of said pair of rotatable support members engages an internal surface of said composite boom opposite an external surface of said composite boom engaged by a second of said pair of rotatable support members, wherein said pair of rotatable support members are opposed to one another.

5. The system of claim 4, wherein each of said at least one pair of rotatable support members includes a perimetrical face, and wherein said perimetrical face has a contour to conformingly engage said external surface or said internal surface of said composite boom.

6. The system of claim 1, further comprising:
a boom collar having a collar first end and a collar second end, said collar first end secured to said tip end of said composite boom; and
a mountable object secured to said collar second end, wherein said mountable object is selected from the group consisting of: a sensor, a magnetometer, a feed horn, or combinations thereof.

7. The system of claim 1, further comprising a deployer housing which disposes in fixed operational relation said spool, a boom guide member, a boom drive assembly, said first support assembly, and a second support assembly in which said composite boom in said planate condition having said root end coupled to said spool extends about said boom guide member and through said boom drive assembly and said first and second support assemblies, whereby said boom drive assembly operates to extend said tip end of said composite boom to generate said tubular condition of said composite boom.

8. A system, comprising:
a spool;
a composite boom which interconverts between a planate condition having a width disposed between a boom first longitudinal edge and a boom second longitudinal edge and a tubular condition having an amount of curvature between said boom first longitudinal edge adjacent said boom second longitudinal edge, said composite boom having a boom length disposed between a root end and a tip end, said planate condition coupled to said spool by said root end, whereby rotation of said spool in a first direction concentrically winds said planate condition of said composite boom about said spool, said tip end extensible from said spool by rotation of said spool in a second direction generating said tubular condition of said composite boom; and
a first support assembly disposed at a first location along said a boom central longitudinal axis to supportingly engage said composite boom as said tip end extends from said spool, said first support assembly including a first or second boom edge guide member a rotatable guide member having an annular groove disposed in a perimetrical face, said annular groove configured to receive only one of said boom first or second longitudinal edge.

9. A system, comprising:
a spool;
a composite boom which interconverts between a planate condition having a width disposed between a boom first longitudinal edge and a boom second longitudinal edge and a tubular condition having an amount of curvature between said boom first longitudinal edge adjacent said boom second longitudinal edge, said composite boom having a boom length disposed between a root end and a tip end, said planate condition coupled to said spool by said root end, whereby rotation of said spool in a first direction concentrically winds said planate condition of said composite boom about said spool, said tip end extensible from said spool by rotation of said spool in a second direction generating said tubular condition of said composite boom; and
a first support assembly disposed at a first location along a boom central longitudinal axis to supportingly engage said composite boom as said tip end extends from said spool, said support assembly including a first or second boom edge guide member having a planar guide face disposed to slidably engage said boom first or second longitudinal edge.

10. The system of claim 9, further comprising a pair of inclined guide faces, said planar guide face disposed medially between said pair of inclined guide faces, said pair of inclined guide faces decreasing in distance from said boom first or second longitudinal edge approaching said planar guide face.

11. The system of claim 10, further comprising a pair of rotatable members correspondingly engaging an internal surface opposite an external surface of said composite boom upon occurrence of said boom first or second longitudinal edge engaging said planar guide face.

12. A system, comprising:
a spool;
a composite boom which interconverts between a planate condition having a width disposed between a boom first longitudinal edge and a boom second longitudinal edge and a tubular condition having an amount of curvature between said boom first longitudinal edge adjacent said boom second longitudinal edge, said composite boom having a boom length disposed between a root end and a tip end, said planate condition coupled to said spool by said root end, whereby rotation of said spool in a first direction concentrically winds said planate condition of said composite boom about said spool, said tip end extensible from said spool by rotation of said spool in a second direction generating said tubular condition of said composite boom;
a first support assembly disposed at a first location along said a boom central longitudinal axis, said first support assembly having a plurality of support members disposed in radially spaced apart relation to supportingly engage an external surface of said composite boom; and
a second support assembly disposed at a second location along said boom central longitudinal axis a fixed distance from in fixed spaced apart relation to said first support assembly, said second support assembly having a plurality of support members disposed in radially spaced apart relation to supportingly engage said external surface of said composite boom.

13. A system, comprising:
a spool;
a composite boom which interconverts between a planate condition having a width disposed between a boom first longitudinal edge and a boom second longitudinal edge and a tubular condition having an amount of curvature between said boom first longitudinal edge adjacent said boom second longitudinal edge, said composite boom having a boom length disposed between a root end and a tip end, said planate condition coupled to said spool by said root end, whereby rotation of said spool in a first direction concentrically winds said planate condition of said composite boom about said spool, said tip end extensible from said spool by rotation of said spool in a second direction generating said tubular condition of said composite boom;
a boom drive assembly which operationally extends and retracts said composite boom;
a boom guide member discretely disposed between said spool and said boom drive assembly, said boom guide member engaging said external surface of said composite boom in said planate condition to align said planate condition with said boom drive assembly.

14. The system of claim 13, wherein said boom drive assembly comprises:
a driven rotatable member; and
an idler member, said driven rotatable member disposed in opposed relation to said idler member, said driven rotatable member and said idler member disposed to correspondingly sufficiently engage said external surface and an internal surface of said composite boom in said planate condition to extend and retract said tip end in response to rotation of said driven rotatable member.

15. The system of claim 14, wherein said idler member comprises an idler rotatable member.

16. The system of claim 15, wherein said driven rotatable member has a perimetrical driven face, said perimetrical driven face configured to frictionally engage said external surface or said internal surface of said composite boom.

17. The system of claim 15, further comprising a plurality of teeth disposed in circumferentially spaced apart relation about said perimetrical driven face of said driven rotatable member, and wherein said composite boom further comprises a plurality of aperture elements disposed in teeth engaging linear relation along said boom length of said composite boom, said plurality of teeth engaging said plurality of aperture elements.

18. The system of claim 14, further comprising a drive coupled to said driven rotatable member, said drive operable to rotate said driven rotatable member.

19. The system of claim 18, wherein said boom guide member comprises a cylindrical member having a perimetrical face, said external surface of said composite boom in said planate condition circumferentially extending about said cylindrical member to align said composite boom in said planate condition with said boom drive assembly.

20. A system, comprising:
a composite boom including a one piece laminate which interconverts between a planate condition having a width disposed between a boom first longitudinal edge and a boom second longitudinal edge and a tubular condition having an amount of curvature between said boom first longitudinal edge and said boom second longitudinal edge, said composite boom having a boom length disposed between a root end and a tip end, said planate condition of said composite boom winds concentrically into a rolled condition, said tip end extensible from said rolled condition generating said tubular condition of said composite boom, wherein a first arcuate longitudinal edge portion extending along said boom length of said tubular condition projects said boom first longitudinal edge either away from or toward a boom central longitudinal axis of said tubular condition, said first arcuate longitudinal edge portion having a lesser arc radius than the medial longitudinal portion of the tubular condition disposing said first arcuate longitudinal edge portion in a plane which increases axial stiffness along said boom length of said tubular condition.

21. The system of claim 20, further comprising a second arcuate longitudinal edge portion extending along said boom length of said tubular condition configured to project said boom second longitudinal edge either away from or toward said boom central longitudinal axis of said tubular condition, said second arcuate longitudinal edge portion having a lesser arc radius than the medial longitudinal portion of the tubular condition disposing said second arcuate longitudinal edge portion in a plane increasing axial stiffness along said boom length of said tubular condition.

22. A system, comprising:
a composite boom which interconverts between a planate condition having a width disposed between a boom first longitudinal edge and a boom second longitudinal edge and a tubular condition having an amount of curvature between said boom first longitudinal edge and said boom second longitudinal edge, said composite boom having a boom length disposed between a root end and a tip end, said planate condition of said composite boom winds concentrically into a rolled condition, said tip end extensible from said rolled condition generating said tubular condition of said composite boom; and
an electrically conductive element extending the entirety of said boom length between said root end and said tip end of said composite boom, said electrically conductive element adapted to conduct electricity or convey digital data from said root end to said tip end, wherein said electrically conductive element extending the entirety of said boom length from said root end and to said tip end of said composite boom being disposed within or between layers of laminable material of a laminate of said composite boom.

\* \* \* \* \*